(12) United States Patent
Jiang et al.

(10) Patent No.: US 11,061,490 B2
(45) Date of Patent: Jul. 13, 2021

(54) CAPACITIVE WIRELESS CHARGING SYSTEMS

(71) Applicant: Apple Inc., Cupertino, CA (US)

(72) Inventors: Bing Jiang, Fremont, CA (US); Blake R. Marshall, San Jose, CA (US); Indranil S. Sen, Cupertino, CA (US); Liquan Tan, Sunnyvale, CA (US); Reza Nasiri Mahalati, Belmont, CA (US); Yi Jiang, Cupertino, CA (US); Mohit Narang, Sammamish, WA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/913,948

(22) Filed: Jun. 26, 2020

(65) Prior Publication Data

US 2020/0326790 A1    Oct. 15, 2020

Related U.S. Application Data

(62) Division of application No. 15/909,769, filed on Mar. 1, 2018, now Pat. No. 10,739,871.

(Continued)

(51) Int. Cl.
*G06F 3/0354* (2013.01)
*H02J 50/05* (2016.01)
*H04B 5/00* (2006.01)

(52) U.S. Cl.
CPC .......... *G06F 3/03545* (2013.01); *H02J 50/05* (2016.02); *H04B 5/0037* (2013.01)

(58) Field of Classification Search
CPC ........ H02J 50/005; H02J 50/05; H02J 7/0044; Y02B 40/00; H04B 5/0037; G06F 3/03545
See application file for complete search history.

(56) References Cited

U.S. PATENT DOCUMENTS 8,947,379 B2    2/2015  Bakken et al.
9,424,048 B2    8/2016  Jakoboski et al.
(Continued)

FOREIGN PATENT DOCUMENTS

CN    203192585 U    9/2013
JP    2015141687 A   8/2015
(Continued)

*Primary Examiner* — Charles V Hicks
(74) *Attorney, Agent, or Firm* — Treyz Law Group, P.C.; Michael H. Lyons

(57) ABSTRACT

A wireless power transmission system may include a wireless power transmitting device such as a tablet computer and a wireless power receiving device such as a computer stylus. A wireless power transmitting capacitor electrode may be formed in the tablet computer. A wireless power receiving capacitor electrode may be formed in the computer stylus. The transmitting capacitor electrode may be driven by a drive signal having a frequency of 900 MHz or greater to produce wireless power. The wireless power may be transmitted from the transmitting capacitor electrode to the receiving capacitor electrode on the stylus via near field capacitive coupling. The transmitting and receiving capacitor electrodes may each include conductive traces on dielectric substrates. The conductive traces may follow meandering paths to maximize the possible capacitive coupling efficiency between the capacitor electrodes and thus the end-to-end charging efficiency of the wireless power transmission system.

20 Claims, 10 Drawing Sheets

Related U.S. Application Data

(60) Provisional application No. 62/491,103, filed on Apr. 27, 2017.

(56) References Cited

U.S. PATENT DOCUMENTS

| | | |
|---|---|---|
| 9,507,381 B1 | 11/2016 | Vanderet et al. |
| 2004/0189542 A1 | 9/2004 | Mori |
| 2008/0204329 A1 | 8/2008 | Taki et al. |
| 2013/0009907 A1 | 1/2013 | Rosenberg et al. |
| 2013/0162589 A1 | 6/2013 | Lien et al. |
| 2013/0057077 A1 | 7/2013 | Rothschild |
| 2015/0002086 A1 | 1/2015 | Matas et al. |
| 2015/0277592 A1* | 10/2015 | Nishigaki ............. G06F 1/1698 345/173 |
| 2015/0363013 A1 | 12/2015 | Coutts et al. |
| 2015/0372505 A1 | 12/2015 | Takahashi |
| 2017/0010697 A1 | 1/2017 | Jiang et al. |

FOREIGN PATENT DOCUMENTS

| | | |
|---|---|---|
| KR | 10-2016-0068099 A | 6/2016 |
| WO | 2015009329 A1 | 1/2015 |

\* cited by examiner

CAPACITIVE WIRELESS CHARGING SYSTEMS

This application is a division of U.S. patent application Ser. No. 15/909,769, filed Mar. 1, 2018, which claims the benefit of provisional patent application No. 62/491,103, filed Apr. 27, 2017, each of which is hereby incorporated by reference herein in its entirety.

FIELD

This relates generally to wireless systems, and, more particularly, to systems in which devices are wirelessly charged.

BACKGROUND

In a wireless charging system, a wireless power transmitting device wirelessly transmits power to a wireless power receiving device. The receiving device receives the wirelessly transmitted power and uses this power to charge an internal battery and to power components in the receiving device. In practice, it can be challenging to ensure that the wireless power is transferred from the transmitting device to the receiving device with satisfactory efficiency.

SUMMARY

A wireless power transmitting device such as a tablet computer may include a wireless power transmitting capacitor electrode coupled to wireless power transmitting circuitry. The tablet computer may have a display cover layer that forms a front face of the tablet computer. The tablet computer may have a housing that includes conductive housing sidewalls extending from a rear face of the tablet computer to the display cover layer. The wireless power transmitting circuitry may supply drive signals to the wireless power transmitting capacitor electrode to produce wireless power (e.g., wireless power signals). The wireless power transmitting capacitor electrode may transmit the wireless power to a wireless power receiving device via near field capacitive coupling. The wireless power transmitting circuitry may supply the drive signals at a relatively high frequency such as 900 MHz or greater.

The wireless power transmitting capacitor electrode may be mounted behind a dielectric window in a given one of the conductive housing sidewalls or in a conductive rear wall that forms the rear face of the tablet computer. The wireless power transmitting capacitor electrode may transmit the wireless power through the dielectric window. If desired, the wireless power transmitting capacitor electrode may be mounted behind the display cover layer and may transmit the wireless power through the display cover layer. The wireless power transmitting electrode may include conductive traces on a dielectric substrate. The conductive traces may follow a meandering path to maximize the perimeter of the wireless power transmitting capacitor electrode and thus the possible capacitive coupling efficiency between the wireless power transmitting capacitor electrode and a wireless power receiving capacitor electrode on the wireless power receiving device.

The wireless power receiving device may be a computer stylus capable of providing a user input to the tablet computer. The computer stylus may include an elongated body having a tip and an opposing end coupled by a shaft that extends along a longitudinal axis and that has a circumference. Electrical components such as a battery may be mounted within the shaft. The computer stylus may include a wireless power receiving capacitor electrode wrapped around at least some of the circumference of the shaft. The wireless power receiving capacitor electrode may receive the wireless power transmitted by the wireless power transmitting capacitor electrode on the tablet computer via near field capacitive coupling. The computer stylus may include rectifier circuitry that converts the received wireless power received into a direct-current (DC) voltage. Power management circuitry may use the DC voltage to power the electrical components. The wireless power receiving capacitor electrode may include a conductive trace on a dielectric substrate. The conductive trace may follow a meandering path to maximize the perimeter of the wireless power receiving capacitor electrode and thus the possible capacitive coupling efficiency between the transmitting and receiving capacitor electrodes.

DETAILED DESCRIPTION

A wireless power system has a wireless power transmitting device that transmits power wirelessly to a wireless power receiving device. The wireless power transmitting device may be a device such as a tablet computer, cellular telephone, watch, media player, laptop computer, desktop computer, computer display device, or other wireless power transmitting equipment. The wireless power transmitting device has one or more capacitor electrodes that are used in transmitting wireless power to one or more wireless power receiving capacitor electrodes in the wireless power receiving device. The wireless power receiving device may be a device such as a computer stylus, cellular telephone, watch, media player, tablet computer, pair of earbuds, headphones or other headset device, remote control, laptop computer, other portable electronic device such as a peripheral or accessory electronic device, or other wireless power receiving equipment.

During operation, the wireless power transmitting device supplies alternating-current drive signals to one or more wireless power transmitting capacitor electrodes. This causes the capacitor electrode to transmit alternating-current electromagnetic signals (sometimes referred to as wireless power signals) to one or more corresponding capacitor electrodes in the wireless power receiving device (e.g., via near-field capacitive coupling). Rectifier circuitry in the wireless power receiving device converts received wireless power signals into direct-current (DC) power for powering the wireless power receiving device.

Figure 1:
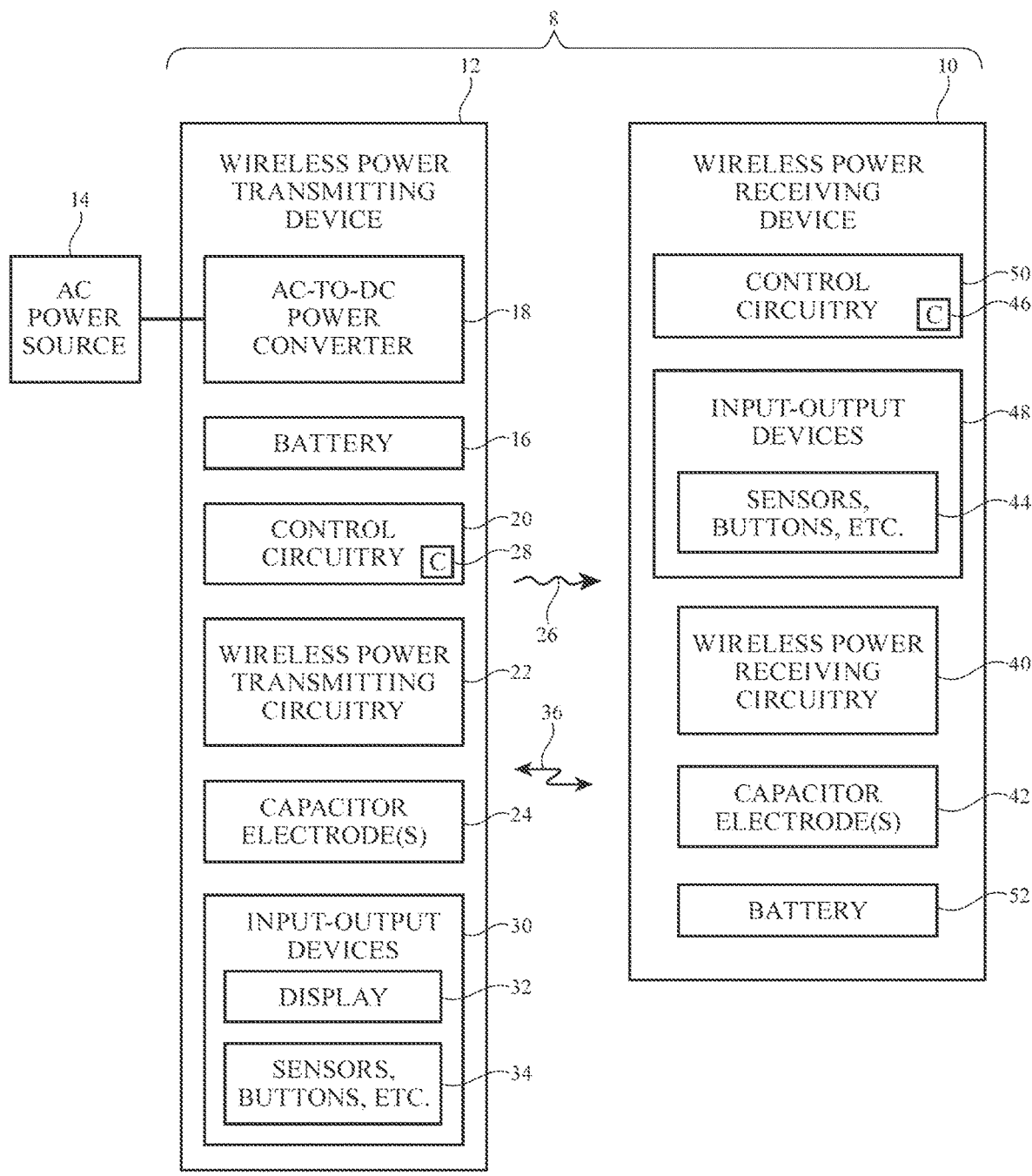
FIG. 1 is a schematic diagram of an illustrative capacitive wireless charging system in accordance with embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be an electronic device such as a tablet computer, computer monitor containing an embedded computer, cellular telephone, wristwatch, media player, laptop computer or other portable electronic device, mousepad, trackpad, keyboard, desktop computer, embedded system such as a system in which electronic equipment is mounted in a kiosk or automobile, equipment that implements the functionality of two or more of these devices, or other wireless power transmitting equipment. Device 10 may be a computer accessory such as a computer stylus, trackpad, computer mouse, headphones, ear buds, or headset, a portable electronic device such as a wristwatch, cellular telephone, tablet computer, laptop computer, or other electronic equipment. Illustrative configurations in which device 12 is a tablet computer and in which device 10 is a computer stylus that is used to provide user input to device 12 are sometimes be described herein as examples.

In order to wirelessly power device 10, a user places device 10 in proximity to power transmitting device 12. Power transmitting device 12 is coupled to a source of alternating-current voltage such as alternating-current power source 14 (e.g., a wall outlet that supplies line power or other source of mains electricity), has a battery such as battery 16 for supplying power, and/or is coupled to another source of power. A power converter such as alternating-current-to-direct current (AC-DC) power converter 18 can convert power from a mains power source or other alternating-current (AC) power source into direct-current (DC) power that is used to power control circuitry 20 and other circuitry in device 12. During operation, control circuitry 20 uses wireless power transmitting circuitry 22 and one or more capacitor electrodes 24 coupled to circuitry 22 to transmit alternating-current electromagnetic signals to device 10 (as shown by path 26) and thereby convey wireless power to wireless power receiving circuitry 40 of device 10.

Power transmitting circuitry 22 may have clocking circuitry that supplies AC signals (clocking or drive signals) to one or more of capacitor electrodes 24 during wireless power transfer operations. One or more capacitor electrodes 24 may be used at a time for wireless power transfer. Capacitor electrodes 24 may sometimes be referred to herein as wireless power transmitting capacitor electrodes, wireless power transmit capacitor electrodes, transmitting capacitor electrodes, transmit capacitor electrodes, wireless power transmitting capacitor plates, transmitting capacitor plates, transmitting electrodes, or transmit electrodes. As examples, a single capacitor electrode 24 may supply power to a single receiving device that overlaps that electrode, two capacitor electrodes 24 may supply power to a single receiving device overlapping those two capacitor electrodes or to a pair of receiving devices overlapping those electrodes, three or more capacitor electrodes may be driven to supply power to a single overlapping receiving device or to multiple overlapping receiving devices, etc.

During power transfer operations, control circuitry 20 may provide control signals to wireless power transmitting circuitry 22 that control circuitry 22 to generate AC signals. Control circuitry 20 may control wireless power transmitting circuitry 22 to provide the AC signals to one or more capacitor electrodes 24 that have been selected for supplying wireless power. As the AC signals pass through one or more capacitor electrodes 24 that have been selected for supplying wireless power, alternating-current electromagnetic fields (wireless power signals) are produced that are received by corresponding capacitor electrodes(s) 42 coupled to wireless power receiving circuitry 40 in receiving device 10 (e.g., capacitor electrodes 24 and 42 may be wirelessly linked over path 26 through near field capacitive coupling). When the alternating-current electromagnetic fields are received by capacitor electrode 42, corresponding alternating-current currents and voltages are produced on capacitor electrode 42. Rectifier circuitry in circuitry 40 converts received AC signals (received alternating-current currents and voltages associated with wireless power signals) from capacitor electrode(s) 42 into DC voltage signals for powering device 10. The DC voltages are used in powering components in device 10 such as sensors and other components 44 (e.g., buttons, accelerometers, force sensors, touch sensors, magnetic sensors, capacitive sensors, resistance sensors, temperature sensors, light sensors, pressure sensors, gas sensors, image sensors, moisture sensors, etc.), wireless communications circuits 46 for communicating wirelessly with corresponding wireless communications circuitry 28 in control circuitry 20 of wireless power transmitting device 12 and/or other equipment, audio components, and other components (e.g., input-output devices 48 and/or control circuitry 50), and are used in charging an internal battery in device 10 such as battery 52.

Devices 12 and 10 include control circuitry 20 and 50, respectively. Control circuitry 20 and 50 each include storage and processing circuitry such as microprocessors, power management units, baseband processors, digital signal processors, microcontrollers, and/or application-specific integrated circuits with processing circuits. Control circuitry 20 and 50 are configured to execute instructions for implementing desired control and communications features in system 8. For example, control circuitry 20 and/or 50 may be used in determining power transmission levels, determining received power levels, processing sensor data, processing user input, processing other information such as information on wireless coupling efficiency from transmitting circuitry 22, processing information from receiving circuitry 40, using sensing circuitry to measure electrode capacitances and other parameters, processing measured capacitance values, using information from circuitry 22 and/or 40 such as signal measurements on output circuitry in circuitry 22 and other information from circuitry 22 and/or 40 to determine when to start and stop wireless charging operations, adjusting charging parameters such as charging frequencies, capacitor electrode settings (e.g., which capacitor electrodes are active), wireless power transmission levels, and performing other control functions.

Control circuitry 20 and/or 50 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 20 and/or 50. The processing circuitry may include application-specific integrated circuits with processing circuitry, one or more microprocessors, or other processing circuitry.

Control circuitry 20 and 50 may be configured to support wireless communications between devices 12 and 10 (e.g., control circuitry 50 may include wireless communications circuitry such as circuitry 46 and control circuitry 20 may include wireless communications circuitry such as circuitry 28). Wireless communications circuitry 28 may include one or more antennas (e.g., antennas that are separate from capacitor electrodes 24). Wireless communications circuitry 46 may include one or more antennas (e.g., antennas that are separate from capacitor electrodes 42). Antennas in communications circuitry 28 and 46 may include one or more monopole antennas, dipole antennas, patch antennas, slot antennas, loop antennas, helical antennas, inverted-F antennas, planar inverted-F antennas, combinations of these, or any other desired types of antennas.

Device 12 and/or device 10 may communicate wirelessly over a wireless communications link established during operation of system 8. Devices 10 and 12 may, for example, have wireless transceiver circuitry in control circuitry 50 and 20 (see, e.g., wireless communications circuitry such as circuitry 46 and 28 of FIG. 1) that allows wireless transmission of signals (e.g., control signals or other wireless data) between devices 10 and 12 over wireless communications link 36. Wireless communications link 36 may be bidirectional (i.e., wireless signals may be conveyed from device 12 to device 10 and from device 10 to device 12) or unidirectional (i.e., wireless signals may be conveyed from device 12 to device 10 or from device 12 to device 10). Wireless signals (data) conveyed over link 36 may be formatted according to a corresponding communications protocol (e.g., by baseband circuitry and transceiver in control circuitry 20 and 50). As examples, wireless signals conveyed over link 36 may be formatted according to a Wireless Personal Area Network (WPAN) protocol such as a Bluetooth® protocol, according to a Wireless Local Area Network (WLAN) signals such as WiFi® protocol, a cellular telephone communications protocol, or any other desired protocol. Antennas that are used in establishing link 36 may include antennas that are separate from capacitor electrodes 24 and 42. In another suitable arrangement, capacitor electrodes 24 and/or 42 may be used in conveying signals over link 36.

Wireless power transmitting device 12 may include input-output devices 30. Input-output devices 30 may be used to allow data to be supplied to device 12 and to allow data to be provided from device 12 to external devices such as device 10. Input-output devices 30 may include user interface devices, data port devices, and other input-output components. For example, input-output devices may include a touch screen (i.e., a display with touch sensors) such as display 32, displays without touch sensor capabilities, and other input-output components such as components 34 (e.g., buttons, joysticks, scrolling wheels, touch pads, key pads, keyboards, microphones, cameras, speakers, status indicators, light sources, audio speakers, fingerprint sensors, light sensors, accelerometers, capacitance sensors, proximity sensors, infrared sensors, magnetic sensors, and other input-output components).

Figure 2:
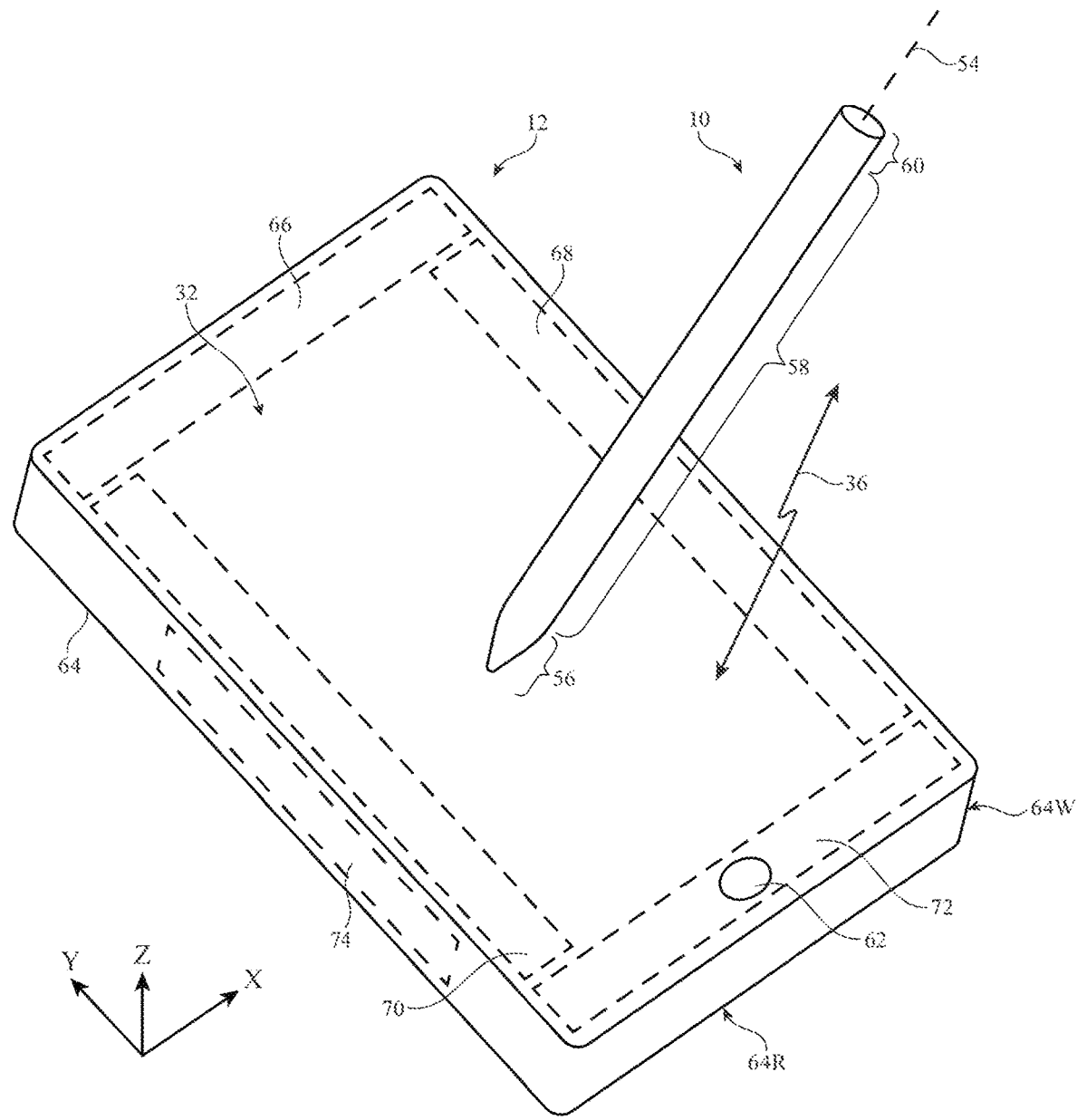
FIG. 2 is a perspective view of an illustrative capacitive wireless charging system having a computer and associated computer stylus in accordance with an embodiment.

In the illustrative configuration of FIG. 2, which is sometimes described herein as an example, device 12 is a tablet computer or other device with a touch screen and device 10 is a computer stylus. A user can use stylus 10 to draw or write on tablet computer 12 and to provide other input to tablet computer 12.

As shown in FIG. 2, tablet computer 12 may include a housing such as housing 64 in which display 32 is mounted. Input-output devices such as button 62 may be used to supply input to tablet computer 12. Display 32 may be a capacitive touch screen display or a display that includes other types of touch sensor technology. The touch sensor of display 32 may be configured to receive input from stylus 10.

Stylus 10 may have a cylindrical shape or other elongated body that extends along longitudinal axis 54. The body of stylus 10 may be formed from metal and/or plastic tubes and other elongated structures. Wireless circuitry 28 in tablet 12 and wireless circuitry 46 in stylus 10 may support wireless communications via wireless communications link 36. As an example, stylus 10 may supply wireless input to tablet 12 via link 36 (e.g., information on settings in a drawing program or other software running on tablet 12, input to select a desired on-screen option, input to supply tablet 12 with a touch gesture such as a stylus flick, input to draw a line or other object on display 32, input to move or otherwise manipulate images displayed on display 32, etc.).

Stylus 10 may have a tip such as tip 56. Tip 56 may contain a conductive elastomeric member that is detected by the capacitive touch sensor of display 32. If desired, tip 56 may contain active electronics (e.g., circuitry that transmits signals that are capacitively coupled into the touch sensor of display 32 and that are detected as touch input on the touch sensor).

Shaft portion 58 of stylus 10 may couple tip 56 of stylus 10 to opposing end 60 of stylus 10. End 60 may contain a conductive elastomeric member, active electronics (e.g., circuitry that transmits signals that are capacitively coupled into the touch sensor of display 32 and that are detected as touch input on the touch sensor), buttons, a metal connector that mates with an external plug, or other input-output components.

A force sensor may be incorporated into tip 56 and/or opposing end 60 of stylus 10. A force sensor may be used to measure how forcefully a user is pressing stylus 10 against the outer surface of display 32. Force data may then be wirelessly transmitted from stylus 10 to tablet 12 so that the thickness of a line that is being drawn on display 32 can be adjusted accordingly or so that tablet 12 may take other suitable action.

If desired, stylus 10 may be provided with a clip to help attach stylus 10 to a user's shirt pocket or other object, may be provided with a magnet to help attach stylus 10 to a magnetic attachment point in tablet 12 or other structure, or may be provided with other structures that help a user attach stylus 10 to external objects. End 60 may have a removable cap, a data port connector to receive a cable (e.g., a cable that supplies power signals for charging a battery in stylus 10 and/or that supplies digital data), input-output devices (e.g., a button and/or a light-emitting diode or other light-based output device), or other components (e.g., metal structures). Other components may be formed on stylus 10 (e.g., on shaft 58 or elsewhere) such as buttons, touch sensors, and other components for gathering input, light-emitting diodes or other components for producing output, etc.

Stylus 10 may include a metal tube or other conductive components in shaft portion 58. The metal tube or other structures in stylus 10 may serve as an antenna ground for one or more antennas in stylus 10. An antenna resonating element for the antenna may be formed from metal traces on a printed circuit or other dielectric support structure and/or from other conductive structures. An antenna resonating element may be located in end region 60, along shaft 58, in tip region 56, or in other suitable portions of stylus 10. The antenna may be used to support wireless link 36. One or more wireless power receiving capacitor electrodes 42 may be formed along shaft 58, in tip region 56, in end region 60, or in other suitable portions of stylus 10. Capacitor electrodes 42 may be formed from metal traces on a printed circuit or other dielectric support structure, on a plastic tube that forms shaft 58, or on other structures, as examples.

Housing 64 of tablet 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 64 may be formed using a unibody configuration in which some or all of housing 64 is machined or molded as a single structure or may be formed using multiple structures (e.g., an internal frame structure, one or more structures that form exterior housing surfaces, etc.). In the example of FIG. 2, housing 64 includes a conductive peripheral sidewall structure 64W that surrounds a periphery of tablet 12. Housing 64 may, if desired, include a conductive rear wall structure 64R that opposes display 32 (e.g., conductive rear wall structure 64R may form the rear exterior face, side, or surface of tablet 12). If desired, rear wall 64R and sidewalls 64W may be formed from a continuous metal structure (e.g., in a unibody configuration) or from separate metal structures. Openings may be formed in housing 64 to form communications ports, holes for buttons, and other structures if desired. In another suitable arrangement, rear wall 64R and/or sidewalls 64W may be formed from dielectric materials such as ceramics, plastic, or glass.

Display 32 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 32 may have an active area that includes an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies.

Display 32 may be protected using a display cover layer such as a layer of transparent glass, clear plastic, transparent ceramic, sapphire, or other transparent crystalline material, or other optically transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of tablet 12 (e.g., extending across an entirety of a length dimension of tablet 12 parallel to the y-axis and a width dimension of tablet 12 parallel to the x-axis of FIG. 2). Sidewalls 64W may extend from a rear face of tablet 12 formed by rear wall 64R to the display cover layer (e.g., extending across a height dimension of tablet 12 parallel to the z-axis of FIG. 2). In another suitable arrangement, the display cover layer may cover substantially all of the front face of tablet 12 or only a portion of the front face of tablet 12. Openings may be formed in the display cover layer. For example, an opening may be formed in the display cover layer to accommodate a button such as button 62. An opening may also be formed in the display cover layer to accommodate ports such as a speaker port. One or more antennas for supporting wireless communications link 36 may be mounted within housing 64.

Housing 64 may have four peripheral edges (e.g., conductive sidewalls 64W). One or more wireless power transmitting capacitor electrodes 24 may be mounted within housing 64 behind display 32. If desired, one or more wireless power transmitting capacitor electrodes 24 may be mounted behind display 32 and adjacent to one of the four peripheral edges. For example, one or more capacitor electrodes 24 may be mounted behind display 32 within peripheral edge region 66, within peripheral edge region 68, within peripheral edge region 72, and/or within peripheral edge region 70. When mounted behind display 32, capacitor electrodes 24 may wirelessly convey power (e.g., over path 26 of FIG. 1) to stylus 10 through display 32 when stylus 10 is placed onto the surface of display 32.

Consider an example in which a single wireless power transmitting capacitor electrode 24 is formed within region 70 of tablet 12. In this scenario, when it is desired to charge stylus 10, a user may place stylus 10 onto the surface of display 32 within region 70 (e.g., so that shaft 58 lies on the surface of display 32 and axis 54 is aligned with the y-axis of FIG. 2). When stylus 10 is placed onto display 32 within region 70, wireless power receiving capacitor electrode 42 on stylus 10 is aligned with the wireless power transmitting capacitor electrode 24 in region 70. When aligned, a near field capacitive coupling may be established between transmitting capacitor electrode 24 and receiving capacitor electrode 42. Transmitting capacitor electrode 24 may transmit wireless power over path 26 to receiving capacitor electrode 42 via the near field capacitive coupling (e.g., by driving capacitor electrode 24 with AC signals). The wireless power received by stylus 10 may be used to charge battery 52. Once battery 52 has become sufficiently charged, the user may pick up stylus 10 and continue to use stylus 10 to provide user input to tablet 12.

If desired, alignment structures may be formed within regions 66, 68, 72, and/or 70 to help ensure that receiving capacitor electrodes 42 on stylus 10 are aligned with transmitting capacitor electrodes 24 on tablet 12 when stylus 10 is placed on the surface of display 32. Examples of such alignment structures include magnetic alignment structures, indentations or grooves formed on the front face of display 32, clip structures, adhesive structures, or any other desired alignment structures. In the example where transmitting capacitor electrodes 24 are located within region 70, magnetic alignment structures may be formed within or adjacent to region 70 and under display 32 if desired. The magnetic alignment structures may attract conductive or magnetic structures on stylus 10 to snap and hold stylus 10 into a position at which capacitor electrodes 24 and 42 are aligned.

If desired, one or more wireless power transmitting capacitor electrodes 24 may be mounted within tablet 12 adjacent to housing sidewalls 64W such as within region 74 of FIG. 2. In scenarios where housing sidewalls 64W are formed from conductive material, a dielectric window may be formed within the sidewalls. Capacitor electrodes 24 may be mounted behind the dielectric windows to allow wireless power to be transferred to stylus 10 when stylus 10 is placed adjacent to the dielectric window.

Consider an example in which a single wireless power transmitting capacitor electrode 24 is formed within region 74 behind a given sidewall 64W of tablet 12. In this scenario, when it is desired to charge stylus 10, a user may place stylus 10 adjacent to sidewall 64W (e.g., onto a surface on which tablet 12 is resting). When stylus 10 is placed adjacent to region 74, wireless power receiving capacitor electrode 42 on stylus 10 is aligned with the wireless power transmitting capacitor electrode 24 within region 74. Transmitting capacitor electrode 24 may then transmit wireless power to receiving capacitor electrode 42 over path 26 for powering stylus 10. If desired, alignment structures may be formed on tablet 12 within or adjacent to region 74 to help ensure that receiving capacitor electrodes 42 on stylus 10 are aligned with transmitting capacitor electrodes 24 when stylus 10 is placed adjacent to sidewall 64W. For example, a magnetic alignment structure may attract magnetic structures on stylus 10 to snap and hold stylus 10 in place adjacent to region 74 of sidewall 64W. Such magnetic alignment structures may, for example, hold stylus 10 to sidewall 64W even if tablet 12 is not resting on a surface (e.g., stylus 10 may remain attached to sidewall 64W even when a user picks up tablet 12).

The example of FIG. 2 is merely illustrative. If desired, one or more wireless power transmitting capacitor electrodes 24 may be formed adjacent to rear housing wall 64R for charging stylus 10 through rear wall 64R. In scenarios where rear housing wall 64R is formed from conductive materials, dielectric windows may be formed within rear housing wall 64R and capacitor electrodes 24 may transmit wireless power to stylus 10 through the dielectric windows in rear housing wall 64R. In another suitable arrangement, rear housing wall 64R may be formed from dielectric (e.g., a dielectric cover layer that forms the rear face of the tablet). In general, wireless power transmitting capacitor electrodes 24 may be formed at any desired location along display 32, along housing sidewalls 64W, and/or along rear housing wall 64R. Locating capacitor electrodes 24 along the periphery of display 32 such as in regions 66, 68, 70, and 72 may allow stylus 10 to be placed on the surface of display 32 without blocking an excessive amount of the viewing region of display 32 (e.g., so that a user can still view images displayed using display 32 while stylus 10 is being charged). However, in general, wireless power transmitting capacitor electrodes 24 may be located at any desired location along the surface of display 32. Wireless power transmitting electrodes 24 may be located along any of the four peripheral sidewalls 64W of tablet 12.

Figure 3:
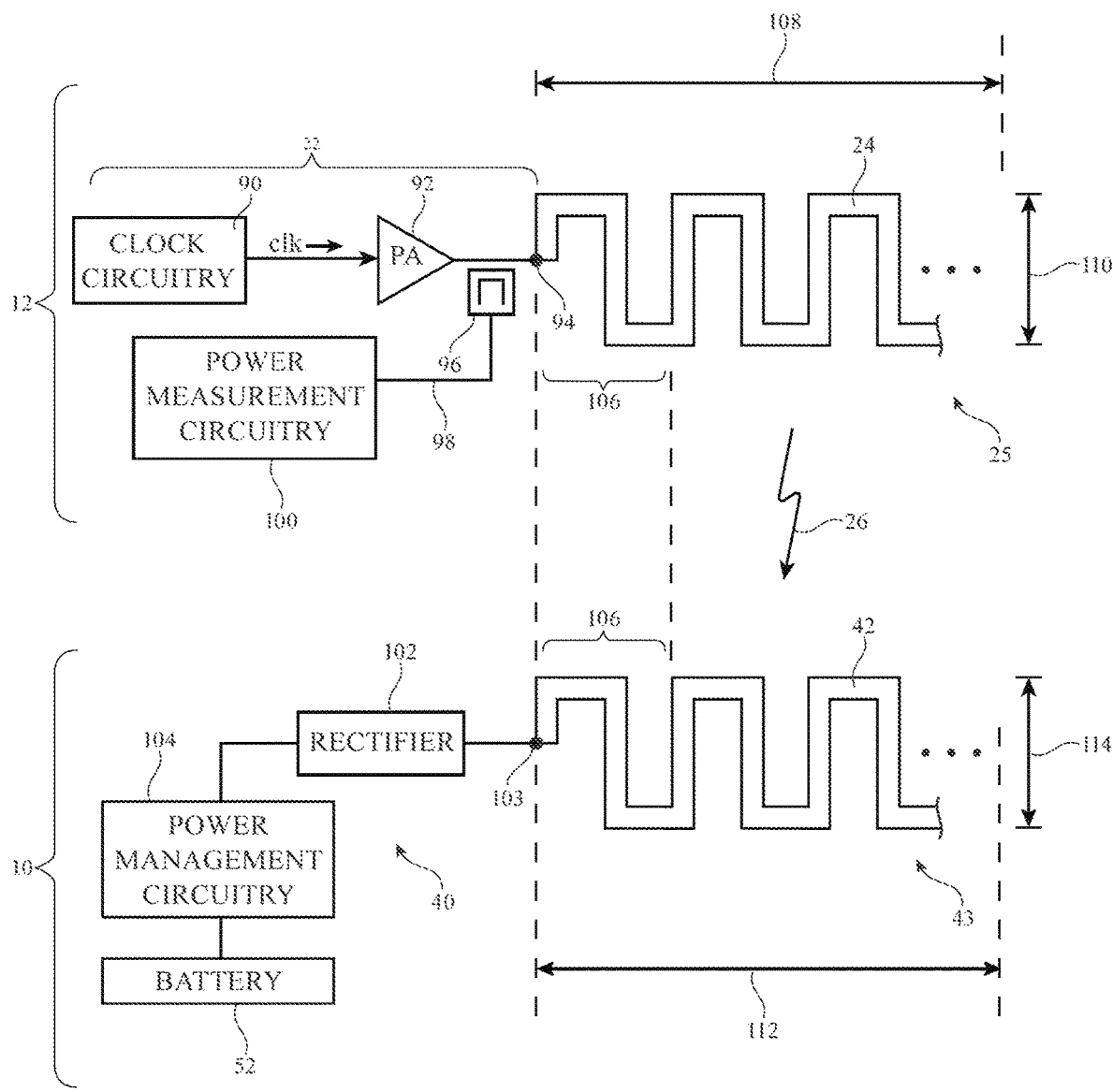
FIG. 3 is a circuit diagram of an illustrative capacitive wireless charging system in accordance with an embodiment.

A circuit diagram of illustrative circuitry for wireless power transfer (wireless power charging) system 8 is shown in FIG. 3. As shown in FIG. 3, wireless power transmitting circuitry 22 of tablet 12 includes clocking circuitry such as clock circuitry 90. As an example, clock circuitry 90 may include phase-locked loop (PLL) circuitry that outputs a clocking signal clk. This example is merely illustrative and, in general, clock circuitry 90 may include any desired clocking circuitry (e.g., a voltage controlled oscillator (VCO) circuit, an off-chip crystal oscillator, etc.).

Clock circuitry 90 may be controlled by control circuitry 20 (FIG. 1) to generate clocking signal clk at a selected frequency (e.g., a square wave signal having the selected frequency). As examples, clock circuitry 20 may generate clocking signal clk at any desired frequency such as a frequency between 900 and 1000 MHz (e.g., 915 MHz), a frequency between 5.0 GHz and 6.0 GHz (e.g., 5.8 GHz), a frequency between 100 MHz and 900 MHz, a frequency less than 100 MHz, a frequency greater than 6.0 GHz, etc. In general, higher frequencies such as frequencies greater than 900 MHz may provide greater charging efficiency for system 8 than frequencies less than 900 MHz. Control circuitry 20 may control clocking circuitry 90 to change the selected frequency over time if desired. The example of FIG. 3 is merely illustrative and, in general, clock circuitry 90 may include any desired oscillator circuitry that supplies an alternating-current (AC) drive signal at the selected frequency (e.g., 900 MHz or greater) to an input of amplifier circuitry 92 (e.g., a sinusoidal signal, square wave, sawtooth signal, etc.).

Clock signal clk may be amplified by power amplifier circuitry 92. The output of power amplifier 92 may be coupled to a corresponding wireless power transmitting capacitor electrode 24 via capacitor electrode terminal 94. Terminal 94 may be formed at a first end of capacitor electrode 24 whereas the opposing second end 25 of electrode 24 may be floating (e.g., end 25 may not be connected to any conductive structures other than the conductive traces of electrode 24 and is not shorted to ground). Power amplifier circuitry 92 may amplify clock signal clk and drive capacitor electrode 24 using the amplified clock signal. In this way, the clock signal may be used to drive capacitor electrode 24 without encoding or modulating the clock signal (e.g., without formatting the clock signal according to a communications protocol).

As shown in FIG. 3, wireless power receiving capacitor electrode 42 on stylus 10 is brought into proximity of wireless power transmitting capacitor electrode 24 on tablet 12 for wirelessly charging stylus 10. In general, the greater (stronger) the near field capacitive coupling between capacitor electrodes 24 and 42, the greater the wireless power transfer efficiency between capacitor electrodes 24 and 42 over path 26 and the greater the overall wireless charging efficiency of system 8 (i.e., the ratio of power used to charge battery 52 on stylus 10 to power drawn from battery 16 on tablet 12 for charging stylus 10). The strength of the near field capacitive coupling between capacitor electrodes 24 and 42 (e.g., the capacitive coupling efficiency) is directly proportional to the degree of alignment between capacitor electrodes 24 and 42 (e.g., a maximal capacitive coupling may occur when capacitor electrodes 24 and 42 are perfectly aligned). Capacitor electrodes 24 and 42 may be perfectly aligned when capacitor electrode 42 completely overlaps capacitor electrode 24 without overlapping an area on tablet 12 that is not covered by capacitor electrode 24, for example. In the example of FIG. 3, capacitor electrodes 24 and 42 have the same shape so as to maximize the degree of alignment and thus the capacitive coupling between the capacitor electrodes. This is, however, merely illustrative. If desired, electrodes 24 and 42 may have different shapes.

If desired, wireless power transmitting circuitry 22 on tablet 12 may include coupler circuitry such as directional coupler 96. Directional coupler 96 may be used to tap the amplified clock signals being conveyed from power amplifier 92 to capacitor electrode 24. Directional coupler 96 may also tap a reflected version of the amplified clock signals that have been reflected off of capacitor electrode 24 back towards power amplifier 92. The tapped clock signals may be processed using receiver circuitry such as power measurement circuitry 100. Power measurement circuitry 100 may gather phase and magnitude information from the tapped antenna signals on path 98 if desired. Control circuitry 20 may use the gathered phase and magnitude information to determine the impedance of capacitor electrode 24 during the operation of wireless power transmitting circuitry 22.

For example, control circuitry 20 may convert the measured phase and magnitude values to complex impedance data points. The complex impedance data points may include, for example, scattering parameter (so-called "S-parameters") values that are indicative of the complex impedance of capacitor electrode 24. Measurements of the S-parameters may include measured reflection coefficient parameter values (S11 values) that are indicative of the amount of signal that is reflected back towards coupler 96 from capacitor electrode 24 during transmission of the clock signal.

Control circuitry 20 may use the impedance of capacitor electrode 24 (e.g., the complex impedance data points or S11 values measured for capacitor electrode 24) to determine whether capacitor electrode 24 is capacitively coupled to wireless power receiving capacitor electrode 42. Circuitry 30 may use the complex impedance values to determine the extent to which the capacitor electrode 24 is capacitively coupled to wireless power receiving capacitor electrode 42.

For example, as capacitor electrode 42 approaches capacitor electrode 24 40 L, the amount of transmitted power that is reflected back towards coupler 96 may change. This change in signal reflection may change the S11 values that are measured over coupler 96. When capacitor electrodes 24 and 42 are aligned and there is a relatively strong capacitive coupling between electrodes 24 and 42, the amount of signal reflection at capacitor electrode 24 may be relatively low (e.g., the value of S11 measured by circuitry 100 may be relatively low). When capacitor electrodes 24 and 42 are misaligned or capacitor electrode 42 is excessively far from capacitor electrode 24 (e.g., when there is relatively weak capacitive coupling between electrodes 24 and 42), the amount of signal reflection at capacitor electrode 24 may be relatively high (e.g., the value of S11 measured by circuitry 100 may be relatively high).

Control circuitry 20 may use this information gathered by circuitry 100 in performing wireless charging of stylus 10. For example, when control circuitry 20 identifies that capacitor electrode 42 has become capacitively coupled to capacitor electrode 24 (e.g., when control circuitry 20 identifies that the near field capacitive coupling between electrodes 24 and 42 exceeds a threshold value or that the value of S11 drops below an S11 threshold value), control circuitry 20 may begin to transmit wireless power or may increase the gain provided by power amplifier 92 for charging stylus 10. This example is merely illustrative and, if desired, other components such as sensors (e.g., capacitive proximity sensors, magnetic sensors, accelerometers, touch sensors, light sensors, etc.) may be used by tablet 12 to identify when capacitor electrode 42 has approached capacitor electrode 24. Power measurement circuitry 100 and coupler 96 may be omitted from tablet 12 if desired.

When driven with the amplified clock signal, capacitor electrode 24 may transmit wireless power to receiving capacitor electrode 42 on stylus 10 via near field capacitive coupling (path 26). Stylus 10 has wireless power receiving circuitry 40. Circuitry 40 includes rectifier circuitry such as rectifier 102 (e.g., a synchronous rectifier controlled by signals from control circuitry 50) coupled to capacitor electrode 42 via capacitor terminal 103. Capacitor terminal 103 may be formed at a first end of capacitor electrode 42 whereas the opposing second end 43 of electrode 42 may be floating (e.g., end 43 may not be connected to any conductive structures other than the conductive traces of electrode 42 and is not shorted to ground). Rectifier 102 converts received alternating-current signals from capacitor electrode 42 (e.g., wireless power signals received by capacitor electrode 42 over path 26) into direct-current (DC) power signals for powering circuitry in stylus 10. Power management circuitry 104 may convey the DC power signals to power load circuitry such as battery 52 within stylus 10. Power management circuitry 104 may, for example, include a power circuit such as a battery charging integrated circuit or other power management integrated circuit(s) that receives power from rectifier circuitry 102 and regulates the flow of this power to battery 52, and/or other input-output devices 48 (FIG. 1). Load circuitry that is powered by DC power signals generated by rectifier 102 may include temperature sensors, accelerometers, pressure sensors, force sensors, compasses and gyroscopes, light-based proximity sensors and other proximity sensors, magnetic sensors, and/or other sensors, buttons, audio components such as speakers and microphones, integrated circuits for implementing control circuitry and communications circuitry (e.g., wireless communications circuitry), and/or other components on stylus 10.

Capacitor electrodes 24 and 42 may each be formed using conductive traces (e.g., metal traces on a dielectric substrate such as a rigid or flexible printed circuit board substrate), metal foil, stamped sheet metal, or any other desired conductive structures. In the example of FIG. 3, capacitor electrode 24 has a footprint defined by a first rectangular dimension 108 and a second rectangular dimension 110. Capacitor electrode 42 has a footprint defined by a first rectangular dimension 112 and a second rectangular dimension 114. In general, the strength of capacitive coupling and the capacitive coupling efficiency of capacitor electrodes 24 and 42 is directly proportional to the perimeter of capacitor electrodes 24 and 42. As space is at a premium in relatively small form-factor devices such as tablet 12 and stylus 10, it may be desirable to limit the size of the footprint of capacitor electrodes 24 and 42 (e.g., the size of dimensions 108, 110, 112, and 114).

In order to maximize the perimeter of capacitor electrodes 24 and 42 for a given footprint size, capacitor electrodes 24 and 42 may each have a meandering shape. For example, as shown in FIG. 3, the conductive traces that form capacitor electrode 24 include alternating vertical portions (e.g., portions extending parallel to dimension 110) and horizontal portions (e.g., portions extending parallel to dimension 108) that collectively follow a meandering or zig-zag path from electrode terminal 94 (e.g., capacitor electrode 24 may follow a meandering path from electrode 94 to floating end 25 and may be ungrounded along its length). Similarly, the conductive traces that form capacitor electrode 42 include alternating vertical portions (e.g., portions extending parallel to dimension 114) and horizontal portions (e.g., portions extending parallel to dimension 112) that collectively follow a meandering path from electrode terminal 103 to floating end 43 (e.g., capacitor electrode 42 may follow a meandering path from electrode 103 to floating end 43 and may be ungrounded along its length). Grounded structures may be formed within tablet 12 and stylus 10 if desired. Because electrodes 24 and 42 are driven by radio-frequency signals (either directly by circuitry 22 or indirectly via capacitive coupling from transmitting electrode 24) and are not grounded along their lengths, electrodes 24 and 42 are different from the grounded structures in tablet 12 and stylus 10.

In the example of FIG. 3, capacitor electrodes 24 and 42 have the same shape so as to maximize the possible capacitive coupling between capacitor electrodes 24 and 42. However, if desired, capacitor electrode 24 may have a different shape than capacitor electrode 42. Because capacitor electrode 24 has a meandering shape, the total length of the conductive traces used to form capacitor electrode 24 (e.g., the total length of capacitor electrode 24 measured over the meandering path from terminal 94 to the opposing floating end of capacitor 24) is greater than dimension 108 and dimension 110. Similarly, the total length of the conductive traces used to form capacitor electrode 42 is greater than dimensions 112 and 114.

In one suitable arrangement, the first dimension 108 of transmitting capacitor electrode 24 may be greater than the first dimension 112 of receiving capacitor electrode 42 (whereas second dimension 110 of transmitting capacitor electrode 24 is the same as second dimension 114 of receiving capacitor electrode 42) and capacitor electrodes 24 and 42 may each be formed from repeating portions 106 of conductive traces. As an example, length 108 may be an integer multiple of length 112. Repeating portions 106 may each include two consecutive vertical and horizontal portions of conductive traces. By forming capacitor electrodes 24 and 42 using repeating portions 106 in this example, the shape of capacitor electrodes 24 and 42 may exhibit a horizontal periodicity that allows capacitor plates 24 and 42 to retain a satisfactory amount of alignment even if capacitor electrode 42 is moved horizontally with respect to capacitor electrode 24 (e.g., even if capacitor electrode 42 or capacitor electrode 24 is shifted left or right as shown in FIG. 3). This may allow for greater tolerance in the positioning of stylus 10 with respect to tablet 12 while still allowing for satisfactory wireless charging efficiency relative to scenarios without such periodicity or scenarios where dimension 108 is not greater than dimension 112 (e.g., capacitor electrode shapes having repeating portions 106 may have greater overall charging efficiency if the position of capacitor electrode 42 is shifted horizontally relative to the position of capacitor electrode 24 than in scenarios where the shape of electrodes 42 and 24 do not include any periodicity). The example of FIG. 3 in which each repeating portion 106 of electrodes 24 and 42 includes two horizontal and two vertical portions of conductive traces is merely illustrative.

In general, repeating portions 106 may include any desired number of conductive trace portions having any desired shapes and orientations.

In general, greater dimensions 108, 110, 112, and 114 may allow for higher capacitive coupling between capacitor electrodes 24 and 42 but also occupy a greater amount of space on devices 10 and 12 than shorter dimensions 108, 110, 112, and 114. As one example, dimension 108 of transmitting capacitor electrode 24 may be between 1 cm and 5 cm whereas dimension 112 of receiving capacitor electrode 42 is between 0.5 cm and 1.5 cm. Second dimension 110 of transmitting capacitor electrode 24 and second dimension 114 of receiving capacitor electrode 42 may be between 1 mm and 1 cm, as an example. These examples are merely illustrative and, in as general, capacitor electrodes 24 and 42 may have any desired dimensions. Second dimension 110 may be greater than first dimension 108 and/or second dimension 114 may be greater than first dimension 112 if desired.

The example of FIG. 3 is merely illustrative. In general, capacitor electrodes 24 and 42 may include conductive traces that follow any desired path and that have any desired shape. Capacitor electrodes 42 and 24 may have straight and/or curved edges. Capacitor electrodes 24 and 42 may be formed from conductive traces on a dielectric substrate such as a plastic support structure or a rigid or flexible printed circuit board substrate, from metal foil, stamped sheet metal, conductive adhesive, and/or from any other desired conductive structures. In scenarios where tablet 12 has multiple capacitor electrodes 24, each capacitor electrode 24 may be coupled to respective clock circuitry 90 and amplifier circuitry 92. Each capacitor electrode 24 may be selectively driven by the corresponding clock circuitry when it is desired to transmit wireless power with that capacitor electrode. In another suitable arrangement, the same clock circuitry 90 and amplifier circuitry 92 may be coupled to drive two or more capacitor electrodes 24. In this scenario, each of the capacitor electrodes 24 may be driven at the same time by the amplified clock signal clk or one or more of the capacitor electrodes may be selectively switched into use when it is desired to transmit wireless power (e.g., using switching circuitry or other multiplexing circuitry interposed between power amplifier 92 and the capacitor electrodes). In scenarios where stylus 12 has multiple capacitor electrodes 42, each capacitor electrode 42 may be coupled to a respective rectifier 102 and power management circuit 104 or two or more capacitor electrodes 42 may be coupled to the same rectifier 102 and/or power management circuit 104.

If desired, other circuitry such as fixed or adjustable impedance matching circuitry, filter circuitry, switching circuitry, and/or other fixed or adjustable components may be interposed between the output of power amplifier 92 and electrode terminal 94 in tablet 12. Other components such as filtering circuitry and/or switching circuitry may be interposed between clock circuitry 90 and the input of power amplifier 92. Similarly, other components such as impedance matching circuitry, filter circuitry, and/or switching circuitry may be interposed between rectifier 102 and electrode 103 and/or between rectifier 102 and power management circuitry 104 of stylus 10 if desired.

Figure 4:
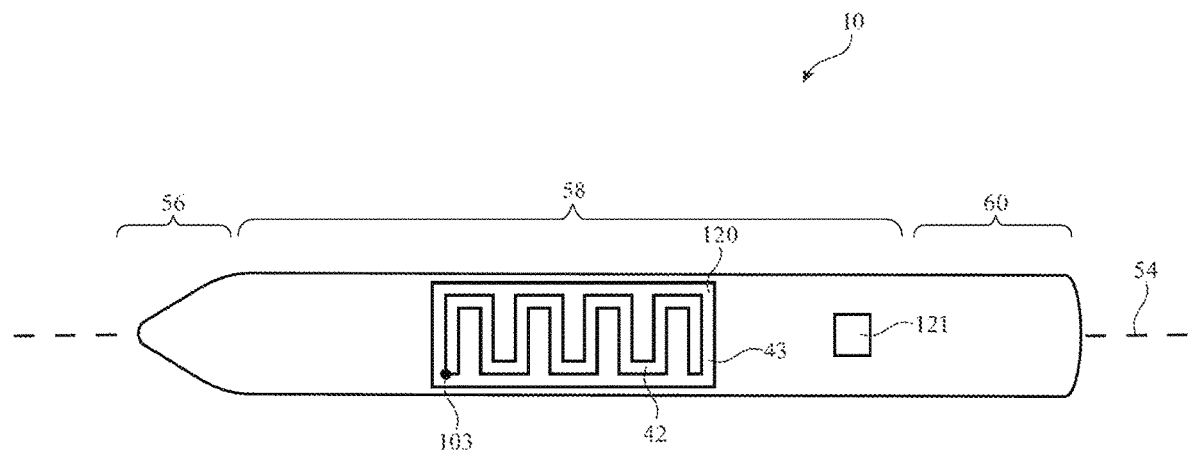
FIG. 4 is a side view of an illustrative computer stylus having one or more wireless power receiving capacitor electrodes in accordance with an embodiment.

FIG. 4 is a side-view of stylus 10 of FIG. 2 having a wireless power receiving capacitor electrode 42 formed on shaft 58. As shown in FIG. 4, wireless power receiving capacitor electrode 42 is formed from a meandering conductive trace on dielectric substrate 120. Capacitor terminal 103 may be coupled to rectifier 102 within stylus 10 using a conductive via extending through substrate 110 or any other desired conductive interconnect structures. Dielectric substrate 120 may be, for example, a flexible printed circuit substrate. Dielectric substrate 120 may be formed on shaft 58 of stylus 10. For example, the housing of stylus 10 may include an elongated plastic and/or metal tube (cylinder) extending from tip portion 56 to end portion 60. Dielectric substrate 120 may be wrapped around at least some of the circumference of the tube (e.g., around longitudinal axis 54). In another suitable arrangement, substrate 120 may be omitted and capacitor plate 42 may be patterned directly onto the plastic tube of shaft 58. If desired, magnetic structures such as magnetic alignment structures 121 may be formed on shaft 58, end 60, and/or tip 56. Alignment structures 121 may include one or more magnets or other conductive structures such as metal. Alignment structures 121 may magnetically couple with magnetic or conductive structures on stylus 12 to hold or snap stylus 10 in place on tablet 12. Alignment structures 121 may be formed on one or more sides of shaft 58. In a scenario where alignment structures 121 are formed on one side of shaft 58, alignment structures 121 may be formed on the same side of shaft 58 as electrode 42 so that structures 121 hold stylus 10 in place on tablet 12 at an orientation in which electrode 42 points towards (faces) electrode 24 on tablet 12. If desired, structures 121 may include a ring formed around the circumference of shaft 58. This may, for example, allow stylus 10 to be snapped to device 10 regardless of the rotational orientation of stylus 10 when placed into contact with tablet 12.

The example of FIG. 4 is merely illustrative. If desired, alignment structures 121 may include other alignment structures such as pins, adhesive, protruding housing portions, recessed housing portions, or any other desired structures for aligning capacitor electrode 42 with capacitor electrode 24 for performing wireless charging. Structures 121 may be omitted if desired. Substrate 120 and capacitor electrode 42 may be formed at any desired location along shaft 58, on tip portion 56, and/or on end portion 60 of stylus 10. Capacitor terminal 103 may be interposed between floating end 43 of electrode 42 and end 60 of stylus 10 if desired. While FIG. 4 only shows a single capacitor electrode 42, any desired number of capacitor electrodes 42 may be formed along the length of shaft 58 and/or on other sides of shaft 58 (e.g., at other locations around axis 54).

Figure 5:
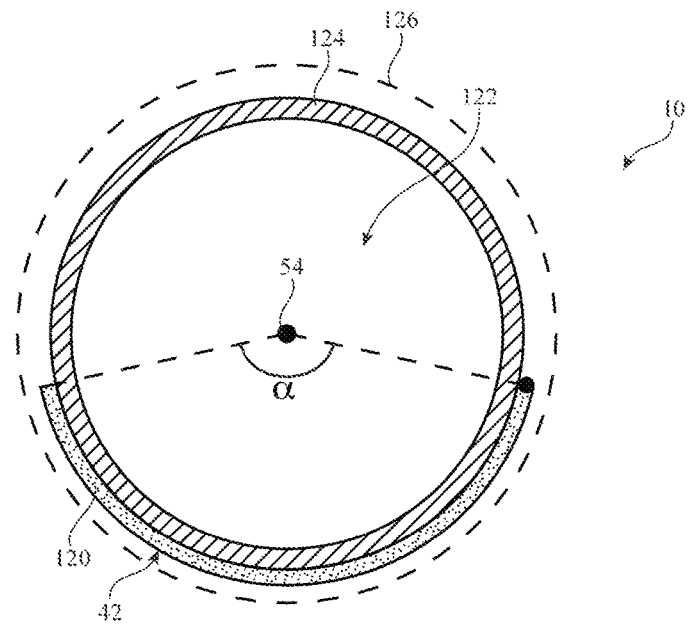
FIGS. 5-7 are cross-sectional side views of an illustrative computer stylus having one or more wireless power receiving capacitor electrodes in accordance with an embodiment.

A cross-sectional side view of shaft portion 58 of the elongated body of stylus 10 is shown in FIG. 5. As shown in FIG. 5, the housing of stylus 10 may surround interior cavity 122. Components such as integrated circuits, battery, 52, rectifier 102, power management circuitry 104, input-output devices 48, control circuitry 50, and other components may be mounted on one or more substrates (e.g., a dielectric support structure such as a rigid printed circuit formed from a rigid printed circuit board material such as fiberglass-filled epoxy or a flexible printed circuit formed from a flexible sheet of polyimide or other flexible polymer layer) within interior cavity 122.

Interior cavity 122 may be surrounded by one or more layers of material such as layer 124 and optional layer 126. These layers of material may form concentric cylindrical tubes and may be formed from metal, plastic, glass, ceramic, other materials, and/or two or more of these materials. As an example, outer layer 126 may form a plastic tube that serves as a cosmetic exterior for stylus 10 and inner layer 124 may form a metal tube that provides stylus 10 with structural support. In general, tube 126 may formed from metal, plastic, or other materials and tube 124 may be formed from metal, plastic, or other materials. If desired, optional outer tube 126 may be omitted. With another illustrative arrangement, inner tube 124 may be omitted and tube 126 may be formed from metal, plastic, or other materials. Configurations in which shaft 58 includes a single tube or includes solid portions without significant interior cavity portions may also be used.

As shown in the cross-sectional side view of stylus 10 of FIG. 5, substrate 120 may be formed on inner tube 124. Capacitor electrode 42 may be patterned onto a surface of substrate 120 (e.g., prior to placing substrate 120 onto tube 124). Outer tube 126 may serve to hide capacitor electrode 42 and substrate 120 from view and may serve to protect capacitor electrode 42 from damage if desired. In another suitable arrangement, capacitor electrode 42 may be patterned directly onto inner tube 124 and substrate 120 may be omitted (e.g., in scenarios where inner tube 124 is formed from a dielectric material).

Figure 6:
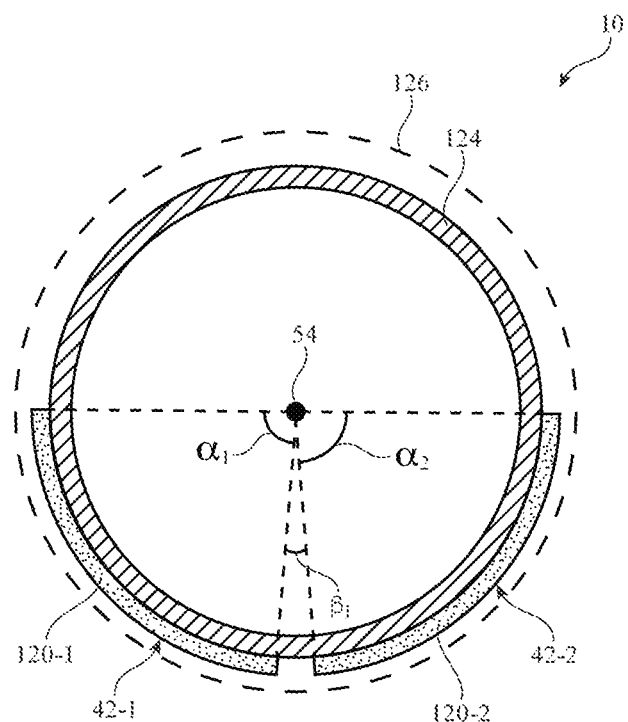

Substrate 120 and capacitor electrode 42 may extend across an angle $\alpha$ around longitudinal axis 54 of stylus 10. Larger angles $\alpha$ may allow for an increased probability of capacitor electrode aligning with transmission capacitor electrode 24 on tablet 12 when stylus 10 is brought into proximity of capacitor electrode 24 relative to smaller angles $\alpha$ (e.g., larger angles $\alpha$ may allow for an increased tolerance to rolling of stylus 10 about axis 54 without sacrificing capacitive coupling efficiency than smaller angles $\alpha$ when performing wireless charging). As examples, angle $\alpha$ may be equal to 30 degrees, 60 degrees, 45 degrees, an angle between 0 degrees and 180 degrees, or any other desired angle between 0 degrees and 360 degrees In the example of FIG. 5, a single wireless power receiving electrode 42 is formed on shaft 58. If desired, two or more capacitor electrodes 42 may be formed at different locations along the circumference of shaft 58. FIG. 6 is a cross-sectional side view of stylus 10 having two capacitor electrodes 42 and corresponding substrates 120 (e.g., a first capacitor electrode 42-1, a second capacitor electrode 42-2, a first substrate 120-1, and a second substrate 120-2).

As shown in FIG. 6, first capacitor electrode 42-1 may be formed on first substrate 120-1 whereas second capacitor electrode 42-2 is formed on second substrate 120-2. Substrates 120-1 and 120-2 may be formed on tube 124. In another suitable arrangement, one or both of capacitor electrodes 42-1 and 42-2 may be patterned directly onto tube 124. If desired, optional tube 126 may be formed over substrates 120-1 and 120-2.

Substrate 120-1 and capacitor electrode 42-1 may extend across an angle $\alpha_1$ around longitudinal axis 54 of stylus 10. Substrate 120-2 and capacitor electrode 42-2 may extend across an angle $\alpha_2$ around axis 54. Substrate 120-1 and capacitor electrode 42-1 may be separated from substrate 120-2 and capacitor electrode 42-2 at tube 124 by separation angle $\beta_1$. Angle $\alpha_1$ may be equal to angle $\alpha_2$ or may be different from angle $\alpha_2$. Separation angle $\beta_1$ may be less than angles $\alpha 1$ and $\alpha_2$. As examples, angles $\alpha_1$ and $\alpha_2$ may each be equal to 60 degrees, 45 degrees, 30 degrees, an angle between 30 degrees and 90 degrees, or any other desired angle between zero and 179 degrees. Angle $\beta_1$ may be equal to 10 degrees, 20 degrees, 30 degrees, 45 degrees, an angle between 5 degrees and 90 degrees, any other desired angle that is less than $\alpha_1$ or $\alpha_2$, or any other desired angle between 0 degrees and 179 degrees. If desired, one of angles $\alpha_1$ or $\alpha_2$ may between 179 and 330 degrees.

In this type of arrangement, capacitor electrodes 42-1 and 42-2 may be located at the side of stylus 10 that is intended to face tablet 12 during wireless charging. For example, magnets or other alignment structures in shaft 58 may be configured to snap the side of stylus 10 at which capacitor electrodes 42-1 and 42-2 are formed into alignment with corresponding wireless power transmission capacitor electrodes 24 on tablet 12. This may help to ensure that capacitors electrodes 42 face transmission capacitor electrodes 24 on tablet 12 so that the capacitor electrodes may exhibit a strong capacitive coupling. Capacitor electrodes 42-1 and 42-2 may receive wireless power from a single transmission capacitor electrode 24 or may each receive wireless power from respective transmission capacitor electrodes 24 on tablet 12.

Figure 7:
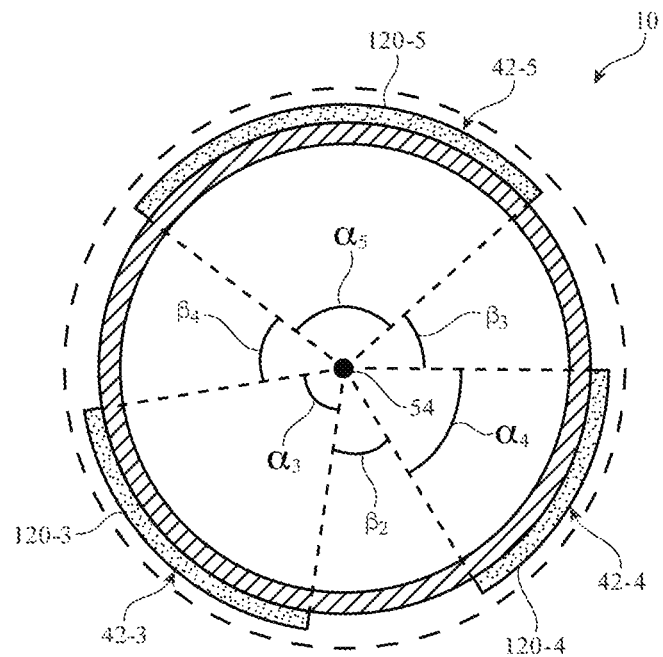

FIG. 7 is a cross-sectional side view of stylus 10 having three capacitor electrodes 42 and corresponding substrates 120 (e.g., a first capacitor electrode 42-3, a second capacitor electrode 42-4, a third capacitor electrode 42-5, a first substrate 120-3, a second substrate 120-4, and a third substrate 120-5). As shown in FIG. 7, first capacitor electrode 42-3 may be formed on first substrate 120-3, second capacitor electrode 42-4 may be formed on second substrate 120-4, and third capacitor electrode 42-5 may be formed on third substrate 120-5. In another suitable arrangement, one or more of capacitor electrodes 42-3, 42-4, and 42-5 may be patterned directly onto tube 124. If desired, optional tube 126 may be formed over capacitor electrodes 42.

Substrate 120-3 and capacitor electrode 42-3 may extend across angle $\alpha 3$ about longitudinal axis 54 of stylus 10. Substrate 120-4 and capacitor electrode 42-4 may extend across angle $\alpha 4$ about axis 54. Substrate 120-5 and capacitor electrode 42-5 may extend across angle as about axis 54. Substrate 120-3 and capacitor electrode 42-3 may be separated from substrate 120-4 and capacitor electrode 42-4 at tube 124 by separation angle $\beta_2$. Substrate 120-4 and capacitor electrode 42-4 may be separated from substrate 120-5 and capacitor electrode 42-5 by separation angle $\beta 3$. Substrate 120-5 and capacitor electrode 42-5 may be separated from substrate 120-3 and capacitor electrode 42-3 by separation angle $\theta 4$.

Separation angles $\beta_2$, $\beta_3$, and $\beta_4$ may each be equal or one or more of separation angles $\beta_2$, $\beta_3$, and $\beta_4$ may be different. Angles $\alpha_3$, $\alpha_4$, and as may each be equal or one or more of angles $\alpha_3$, $\alpha_4$, and as may be different. Separation angles $\beta_2$, $\beta_3$, and $\beta_4$ may each be less than, equal to, or greater than angles $\alpha_3$, $\alpha_4$, and $\alpha_5$. As examples, one or more of angles $\alpha_3$, $\alpha_4$, and as may be equal to 60 degrees, 45 degrees, 30 degrees, an angle between 30 degrees and 90 degrees, or any other desired angle between zero and 119 degrees. One or more of angles $\beta_2$, $\beta_3$, and $\beta_4$ may be equal to 10 degrees, 20 degrees, 30 degrees, 45 degrees, 60 degrees, an angle between 5 degrees and 90 degrees, any other desired angle between 0 degrees and 119 degrees. If desired, one of angles $\alpha_3$, $\alpha_4$, or as may between 179 and 330 degrees. If desired, one of angles $\beta_2$, $\beta_3$, or $\beta_4$ may be between 179 and 330 degrees.

In this type of arrangement, capacitor electrodes 42-3, 42-4, and 42-5 may be located along different sides of stylus 10. Capacitor electrodes 42-3, 42-4, and 42-5 may receive wireless power from a single transmission electrode 24 or may receive wireless power from two or more transmission electrodes 24 on tablet 12. Forming capacitor electrodes 42 in this way may help to ensure that at least one capacitor electrode 42 is capacitively coupled to a corresponding transmission capacitor electrode 24 when placed in proximity to tablet 12 regardless of the rotational orientation of stylus 10 about axis 54. Magnetic alignment structures 121 (FIG. 4) may be formed from a ring extending 360 degrees around the circumference of shaft 58 or using two or more discrete magnets on different sides of shaft 58 in the example of FIG. 7 if desired.

The examples of FIGS. 4-7 in which stylus 10 has a cross-sectional shape are merely illustrative. In general, stylus 10 may have any desired cross-sectional shape. For example, shaft 58 may have a rectangular cross section, elliptical cross section, triangular cross section, hexagonal cross section or any other desired polygonal cross section (e.g., with each capacitor electrode 42 being formed on one or more sides of the polygonal cross section), combinations of these, etc.

Figure 8:
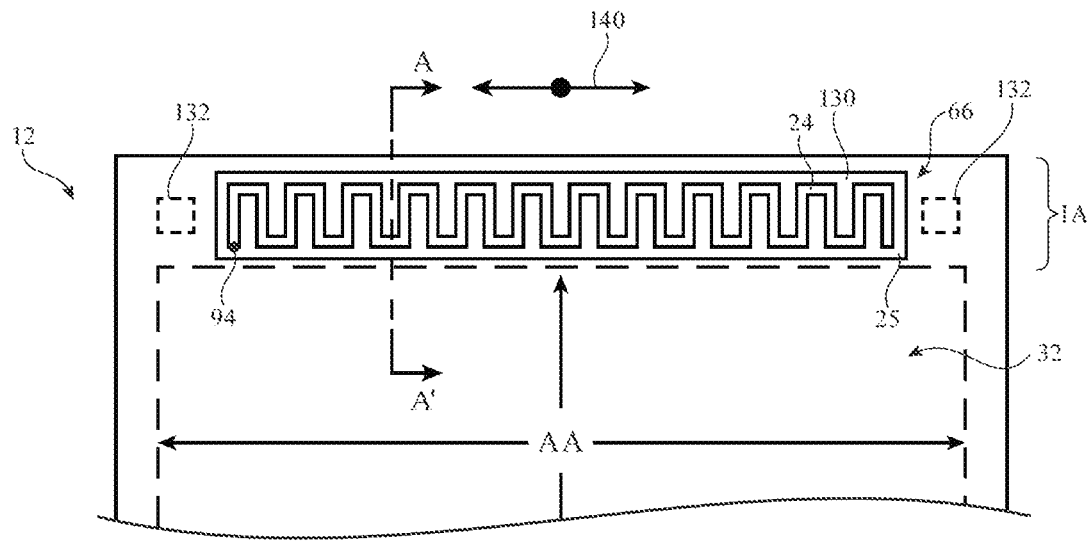
FIG. 8 is a top-down view of an illustrative tablet computer having a wireless power transmitting capacitor electrode in accordance with an embodiment.

FIG. 8 is a top-down view of tablet 12 of FIG. 2 having a wireless power transmission capacitor electrode 24 adjacent to display 32 for charging stylus 10. As shown in FIG. 8, wireless power transmission capacitor electrode 24 is formed within region 66 of display 32 (FIG. 2). This example is merely illustrative and, if desired, capacitor electrode 24 may be formed within regions 68, 72, and/or 70 of FIG. 2 or elsewhere along the lateral area of display 32.

Display 32 may have an active area AA that includes an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. Display 32 may be protected using a display cover layer such as a layer of transparent glass, clear plastic, transparent ceramic, sapphire, or other transparent crystalline material, or other transparent layer(s). The display cover layer may extend across active area AA and inactive area IA (e.g., across the entire length and width of tablet 12) and may cover capacitor electrode 24.

Display 32 may have an inactive border region that runs along one or more of the edges of active area AA. Inactive area IA may be free of pixels for displaying images and may overlap circuitry and other internal device structures in tablet 12. To block these structures from view by a user of tablet 12, the underside of the display cover layer or other layer in display 32 that overlaps inactive area IA may be coated with an opaque masking layer in inactive area IA. The opaque masking layer may have any suitable color. This example is merely illustrative and, if desired, capacitor electrode 24 may be formed within active area AA.

As shown in FIG. 8, capacitor electrode 24 is formed on substrate 130. Substrate 130 may be, for example, a rigid or flexible printed circuit, a plastic support structure, or any other desired support structure. Electrode terminal 94 may be coupled to power amplifier 92 (FIG. 3) using a conductive via that extends through substrate 130 or using any other desired conductive interconnect structures (e.g., conductive pins or clips, conductive springs, conductive foam or adhesive, welds, solder, etc.). Capacitor electrode 24 may be formed from conductive traces that are patterned onto substrate 130. Capacitor terminal 94 may be formed at any desired location along the conductive traces forming capacitor electrode 24. Alignment structures such as alignment structures 132 may be formed under or on the display cover layer.

As one example, alignment structures 132 may include an indentation or groove in the exterior surface of the display cover layer. When a user wishes to wirelessly power (charge) stylus 10, the user may place stylus 10 within the groove. The groove may hold stylus 10 in place on the surface of the display cover layer to keep stylus 10 from rolling off of tablet 12 and/or to ensure that transmission capacitor electrode 24 on tablet 12 is aligned with receiving capacitor electrode 42 on stylus 10 for performing wireless power transfer operations (e.g., to ensure sufficient capacitive coupling for wireless power transfer).

As another example, alignment structures 132 may be magnetic structures mounted under the display cover layer. When a user wishes to wirelessly power stylus 10, the user may place stylus 10 on the display cover layer over within region 66 (e.g., with the longitudinal axis 54 of stylus 10 parallel to the top edge of tablet 12). Magnetic structures 132 may snap stylus 10 in place over capacitor electrode 24 (e.g., in such a way so as to align transmit capacitor electrode 42 with capacitor electrode 42 on stylus 10 for performing wireless power transfer operations). These examples are merely illustrative. If desired, alignment structures 132 may include pin structures, adhesive structures, clip structures, or may be omitted.

By forming transmission capacitor electrode 24 with a greater dimension 108 than dimension 112 of receiving electrode 42 (FIG. 3), stylus 10 may be moved horizontally on the surface of display 32 (as shown by arrows 140) without impacting the near field capacitive coupling between transmit capacitor electrode 24 and receive capacitor electrode 42. Transmission capacitor electrode 24 may extend across some or all of the width of tablet 12. In one suitable arrangement, transmission capacitor electrode 24 may extend across at least half of the width of tablet 12. If desired, capacitor electrode 24 of FIG. 8 may be replaced by two or more separate, discrete capacitor electrodes 24.

Figure 9:
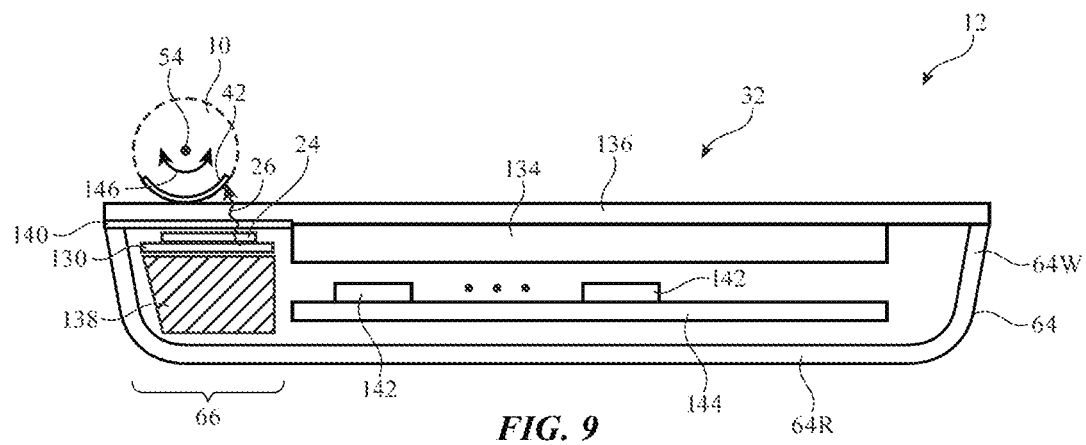
FIGS. 9 and 10 are cross-sectional side views of an illustrative tablet computer having a wireless power transmitting capacitor electrode in accordance with an embodiment.

FIG. 9 is a cross-sectional side view of tablet 12 having a display-adjacent wireless power transmitting capacitor electrode 24 (e.g., as taken along line AA' of FIG. 8). As shown in FIG. 9, tablet computer 12 includes conductive housing 64. Conductive housing 64 includes conductive rear wall 64R and conductive sidewalls 64W. Display 32 includes an associated display module 134 and display cover layer 136. Display module 134 may be a liquid crystal display module, an organic light-emitting diode display, or other display for producing images for a user. Display module 134 may include touch sensitive components. Display cover layer 136 may be a clear sheet of glass, a transparent layer of plastic, or other transparent member. Display cover layer 136 may be formed from dielectric. If desired, display cover layer 136 may form a portion of display module 134.

In active area AA, an array of display pixels associated with display structures such as display module 134 may present images to a user of tablet 12. In inactive display border region IA, the inner surface of display cover layer 136 may be coated with a layer of black ink or other opaque masking layer 140 to hide internal device structures from view by a user. Wireless power transmission capacitor electrode 24 may be mounted within housing 64 under opaque masking layer 140. Forming capacitor electrode 24 under inactive region IA of display 14 may allow capacitor electrode 24 to transmit wireless power over path 26 through display cover layer 136 without the wireless power being blocked or otherwise impeded by the active circuitry in display module 134. Other components 142 may be formed within housing 64 (e.g., components such as portions of wireless power transmitting circuitry 22, control circuitry 20, battery 16, converter 18, and some of input-output devices 30 of FIG. 1). Components 142 may be mounted to one or more substrates such as printed circuit board 144 (e.g., a main logic board).

In the example of FIG. 9, substrate 130 is placed on a top surface of dielectric support structure 138. Support structure 138 may be a plastic support structure, foam support structure, or any other desired support structure. If desired, support structure 138 may mechanically bias substrate 130 and capacitor electrode 24 towards display cover layer 136 (e.g., capacitor electrode 24 may be placed into contact with ink layer 140 and/or display cover layer 136). In another suitable arrangement, substrate 130 may be omitted and capacitor electrode 24 may be formed from sheet metal or metal foil placed over support structure 138 or may be formed from conductive traces patterned directly onto support structure 138. Dielectric support structure 138 may be hollow or solid or may include hollow and solid portions. If desired, dielectric support structure 138 may form a cavity for a speaker on tablet 12.

As shown in FIG. 9, stylus 10 may be placed on the exterior surface of display cover layer 136 within region 66 for wirelessly powering stylus 10. When stylus 10 is placed on display cover layer 136, wireless power receiving capacitor electrode 42 is capacitively coupled with wireless power transmitting electrode 24. The capacitive coupling may be relatively unaffected by the vertical separation between the edge of capacitor electrode 42 and the surface of display cover layer 136. This is in contrast to scenarios in which inductive coils are used for wirelessly charging stylus 10. In such inductive charging arrangements, the inductive coils are significantly larger than the capacitor electrodes and are unable to maintain satisfactory coupling due to the radius of curvature of stylus 10 excessively separating transmit and receive coils. In addition, by extending capacitor electrode 42 across a suitably large angle α, stylus may roll/rotate around axis 54 as shown by arrow 146 without significantly reducing the capacitive coupling between electrodes 42 and 24. Wireless charging operations performed over a capacitive coupling link between electrodes 42 and 24 may thereby be rotationally invariant about axis 54.

The example of FIG. 9 in which capacitor electrode 24 is placed on dielectric support structure 138 is merely illustrative. In another suitable arrangement, capacitor electrode 24 may be placed on a portion of conductive sidewall 64W, as shown in FIG. 10.

Figure 10:
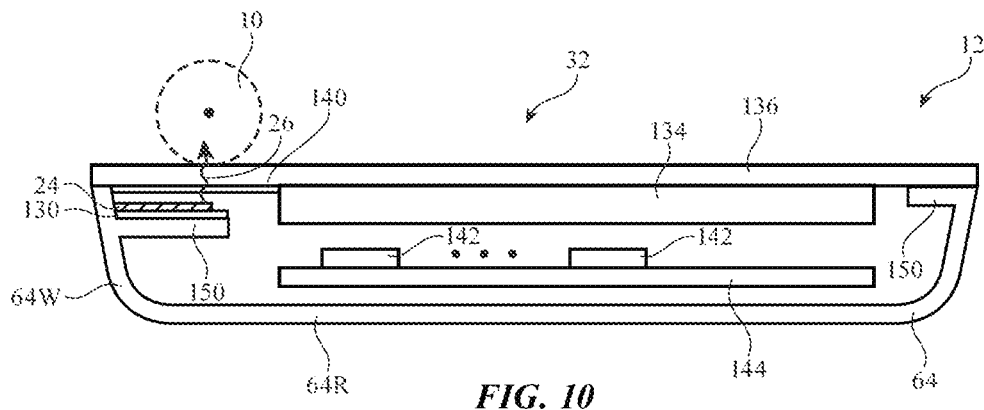

As shown in FIG. 10, conductive housing sidewall 64W may include a ledge portion 150 that extends towards the interior of tablet 12. Display cover layer 136 may be placed on ledge 150. Ledge 150 may provide structural support for display cover layer 136. If desired, adhesive may be used to adhere display cover layer 136 to ledge 150. Substrate 130 and capacitor electrode 24 may be formed on ledge 150. Capacitor electrode 24 may transmit wireless power to stylus 10 over path 26 via near field capacitive coupling (e.g., through opaque masking layer 140 and display cover layer 136). Adhesive may be interposed between capacitor electrode 24 and display cover layer 136 if desired.

Figure 11:
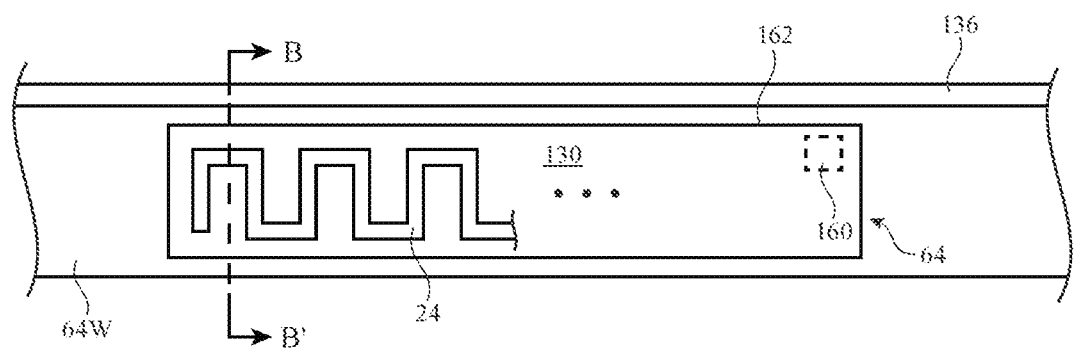
FIG. 11 is a side view of an illustrative tablet computer having a wireless power transmitting capacitor electrode aligned with a window in a conductive sidewall in accordance with an embodiment.

FIG. 11 is a side-view of tablet 12 having wireless power transmission capacitor electrode 24 formed adjacent to a corresponding housing sidewall 64W for charging stylus 10. As shown in FIG. 11, wireless power transmission capacitor electrode 24 is formed within region 74 of housing sidewall 64W (FIG. 2). Sidewall 64W may be formed from conductive material such as metal. A dielectric window 162 may be cut into sidewall 64W. Capacitor electrode 24 and substrate 130 may be aligned with window 162.

Capacitor electrode 24 may transmit wireless power through window 162 for wirelessly charging stylus 10. If desired, alignment structures 160 may be formed behind or on window 162. As an example, alignment structures 160 may include magnetic structures mounted under window 162 (e.g., magnetic structures mounted to an interior surface of window 162 or mounted to a substrate aligned behind window 162). When a user wishes to wirelessly power (charge) stylus 10, the user may place stylus 10 adjacent to window 162 (e.g., either directly onto housing sidewall 64W and window 162 or adjacent to window 162 on a surface on which tablet 12 is resting). Magnetic structures 160 may magnetically couple with magnetic structures on stylus 10 (e.g., one or more magnets or metal structures on stylus 10) and may snap stylus 10 into place in such a way so as to align transmit capacitor electrode 24 with receive capacitor electrode 42 on stylus 10 for performing wireless power transfer operations. If desired, magnetic structures 160 may affix stylus 10 to housing sidewall 64W so that tablet 12 and stylus 10 can be picked up off of a surface without disrupting wireless power transfer operations to stylus 10. These examples are merely illustrative. If desired, alignment structures 160 may include pin structures, adhesive structures, clip structures, or may be omitted. Alignment structures 160 may be mounted to conductive housing sidewall 64W if desired.

Figure 12:
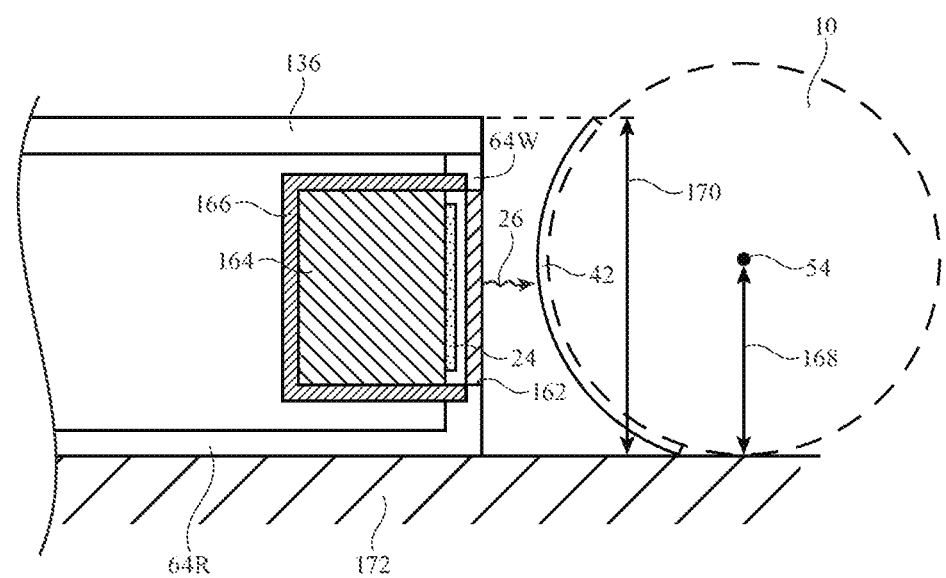
FIG. 12 is a cross-sectional side view of an illustrative tablet computer having a wireless power transmitting capacitor electrode aligned with a window in a conductive sidewall in accordance with an embodiment.

FIG. 12 is a cross-sectional side view of tablet 12 having a sidewall-adjacent wireless power transmitting capacitor electrode 24 (e.g., as taken along line BB' of FIG. 11). As shown in FIG. 12, tablet computer 12 includes conductive housing 64. Dielectric window 162 is formed within sidewall 64W of conductive housing 64. Capacitor electrode 24 may be formed on dielectric support structure 164 and aligned with window 162. Dielectric support structure 164 may include plastic, foam, ceramic, or any other desired materials. Capacitor electrode 24 may be patterned onto a surface of support structure 164 or may be formed on another substrate (e.g., a flexible printed circuit board) that is placed onto or adhered to support structure 164. Capacitor electrode 24 may be separated from window 162 or may be placed into contact with window 162. If desired, support structure 164 may bias capacitor electrode 24 against window 162.

In the example of FIG. 12, capacitor electrode 24 is formed on a given side/surface of support structure 164 (e.g., the side of structure 164 facing window 162). The remaining sides of substrate 164 may be covered by conductive structures 166. Conductive structures 166 may be coupled to a ground plane or other ground structures within tablet 12 (e.g., using conductive foam, conductive connectors such as screws or clips, solder, welds, wires, conductive pins or contact pads, conductive adhesive, conductive tape, or using any other desired conductive interconnect structures) and may sometimes be referred to herein as grounded conductive structures 166. Grounded conductive structures 166 may include sheet metal structures, conductive traces, metal foil, conductive portions of electronic components within tablet 12, conductive housing portions, or any other desired conductive structures. If desired, conductive structures 166 may be shorted to conductive housing 64 (e.g., along the peripheral edges of window 162). Grounded conductive structures 166 may form a grounded cavity that backs capacitor electrode 24 and that shields capacitor electrode 24 from other components within tablet 12. The grounded cavity formed by structures 166 may surround substrate 164 (e.g., substrate 164 and electrode 24 may be enclosed within and completely surrounded by housing wall 64W, window 162, and conductive structures 166). If desired, one or more sides of substrate 164 may be free of structures 166 (e.g., structures 166 need not be formed on all remaining sides of substrate 164). In one suitable arrangement, a grounded conductive structure such as a conductive trace, sheet metal layer, metal foil layer, or conductive portion of an electrical component within tablet 12 is formed on the side of dielectric support structure 164 that opposes the side of support structure on which capacitor electrode 24 is formed. In this scenario, the grounded conductive structure on the side of substrate 164 opposing electrode 24 may be shorted to housing wall 64W and/or housing wall 64R using any desired conductive interconnect structures such as conductive foam, conductive screws, conductive clips, solder, welds, wires, conductive pins, conductive adhesive, conductive tape, metal traces on substrate 164, stamped sheet metal, metal foil, contact pads, other conductive housing portions, or any other desired conductive structures.

When stylus 10 is placed adjacent to window 162, wireless power receiving capacitor electrode 42 on stylus 10 is placed into a relatively strong capacitive coupling with wireless power transmitting electrode 24. In the example of FIG. 12, tablet 12 is placed onto surface 172 (e.g., a table or desktop). Stylus 10 may be placed onto surface 172 adjacent to window 162 for wirelessly charging stylus 10. If desired, alignment structures 160 (FIG. 11) may interact with magnetic components on stylus 10 to hold stylus 10 against sidewall 64W with capacitor electrode 42 aligned with capacitor electrode 24. Capacitor electrode 24 may subsequently transmit wireless power to capacitor electrode 42 via near field capacitive coupling (e.g., over path 26).

Figure 13:
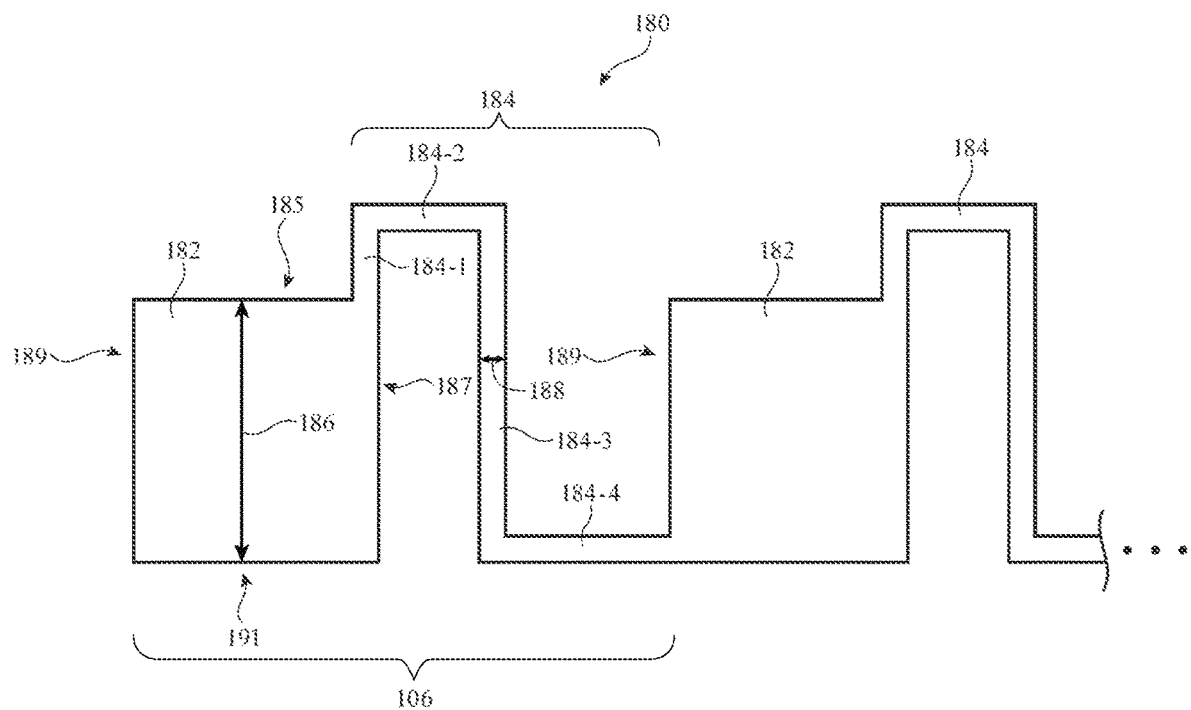
FIGS. 13 and 14 are diagrams of illustrative conductive traces that may be used in forming wireless power transmitting and/or receiving capacitor electrodes in accordance with an embodiment.

In general, capacitor electrodes 24 and 42 may have any desired shapes. In the example of FIGS. 3, 4, 8, and 11, capacitor electrodes 24 and 42 are formed from conductive traces that follow a meandering path and that have a uniform width across their length. In general, the conductive traces that form capacitor electrodes 24 and 42 need not have a uniform width across their lengths. FIG. 13 is a diagram showing how the conductive traces may have non-uniform widths.

As shown in FIG. 13, conductive trace 180 may include multiple repeating units (segments) 106 that follow a meandering path. Conductive trace 180 may be used in forming transmit capacitor electrode 24 and/or receive capacitor electrode 42. Capacitor electrode 24 and capacitor electrode 42 may each include any desired number of repeating units 106 (e.g., between one and ten repeating units 106, thirteen repeating units 106, sixteen repeating units 106, between ten and twenty repeating units 106, more than twenty repeating units 106, etc.). Each repeating unit 106 of conductive trace 180 includes a thick portion 182 and a thin portion 184 extending from a first edge 185 of the thick portion. Thick portion 182 has a width 186 that is greater than the width 188 of thin portion 184.

Thin portions 184 of trace 180 may each include a first segment 184-1 extending from first edge 185 of the corresponding thick portion 182, a second segment 184-2 extending from an end of first segment 184-1, a third segment 184-3 extending from an end of second segment 184-2, and a fourth segment extending from an end of third segment 184-3 to second edge 189 of the thick portion 182 in the next repeating unit 106. In the example of FIG. 13, segment 184-2 extends parallel to segment 184-4 whereas segment 184-1 extends parallel to segment 184-3. Segments 184-4 and 184-2 extend perpendicular to segments 184-1 and 184-3. This example is merely illustrative. In general, segments 184-1, 184-2, 184-3 and 184-4 may extend at any desired angles in any desired shape. Conductive trace 180 may have any desired shape. The edges of conductive trace 180 may be curved and/or straight. Thick portions 182 of conductive trace 180 may serve to increase the overall capacitance of capacitor electrodes 24 and 42 given the constraints imposed by the relatively small footprint defined by dimensions 108, 110, 112, and 114 of FIG. 3. Thin portions 184 of conductive trace 180 may be used to increase the overall perimeter and inductance of capacitor electrodes 24 and 42 given the constraints imposed by the relatively small footprint defined by dimensions 108, 110, 112, and 114 of FIG. 3.

In some scenarios, the diameter of stylus 10 is greater than the height (thickness) 170 of tablet 12 (FIG. 12). In other words, the radius of stylus 10 may be greater than half the height 170 of tablet 12. In the example of FIG. 12, stylus 10 has a radius 168 that is greater than half of height 170 of tablet 12. In this scenario, when both tablet 12 and stylus 10 are placed on surface 172 for wirelessly charging stylus 10, capacitor electrode 42 may be slightly misaligned with respect to wireless power transmission capacitor electrode 24 (e.g., portions of capacitor electrode 42 may extend beyond the height of tablet 12). If desired, conductive traces 180 that are used to form capacitor electrodes 24 and/or 42 may be provided with a short circuit path that serves to redistribute current on the capacitor electrodes to compensate for these misalignments.

Figure 14:
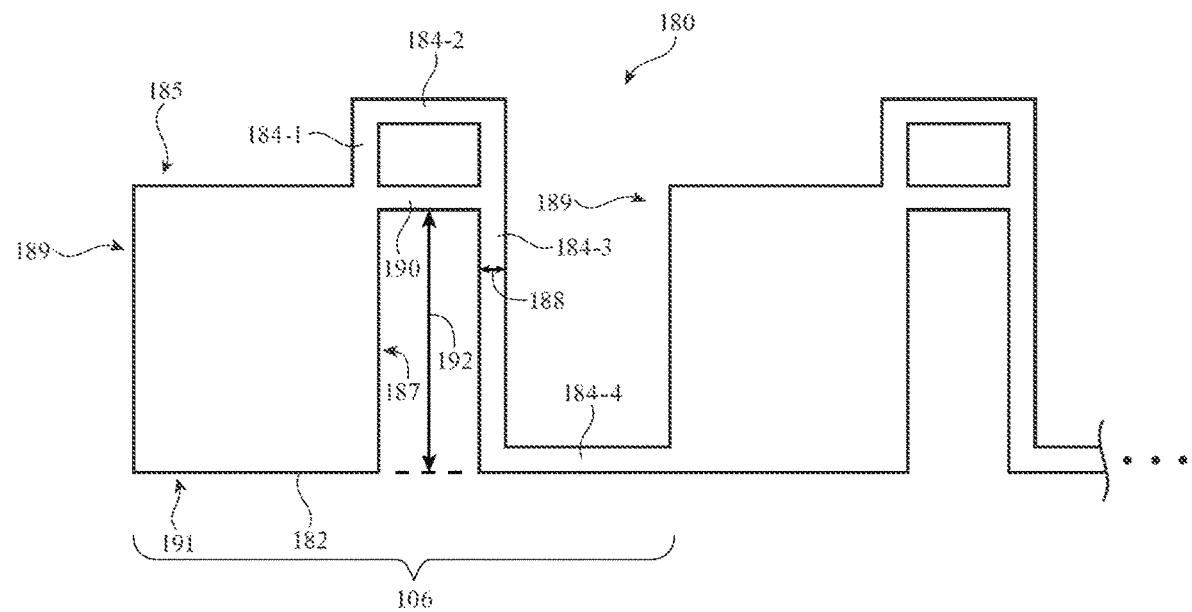

As shown in FIG. 14, a short path 190 may be coupled between third edge 187 of thick portion 182 and segment 184-3 of thin portion 184 in each repeating unit 106 of conductive trace 180. In the example of FIG. 14, short path 190 is coupled to third edge 187 of thick portion 182 adjacent to where segment 184-1 is coupled to thick portion 182 at edge 185. However, in general, short path 190 may be located at any desired distance 192 with respect to lower edge 191 of trace 180. Edges 189, 185, 187, and 191 of thick portion 182 may sometimes be referred to herein as sides or ends of thick portion 182. In the example of FIGS. 13 and 14, edges 189, 185, 187, and 191 are straight, where edge 189 extends parallel to edge 187 and edge 185 extends parallel to edge 191 and perpendicular to edges 189 and 187. This is merely illustrative and, in general, edges 189, 185, 187, and/or 191 may have any desired shape and may extend at any desired angles with respect to each other. Distance 192 may be, in one example, between 1 mm and 2 mm. Short path 190 may extend parallel to segment 184-2 or may extend at a non-zero angle with respect to segment 184-2. Segment 190 may have the same thickness 188 as segment 184-2 or may have a different thickness. Short path 190 may have straight edges and/or curved edges. If desired, two or more short paths 190 may be coupled between segment 184-3 and thick portion 182. Short path 190 may be coupled between segment 184-3 and 184-1 if desired. In another suitable arrangement, short path 190 may extend from segment 184-3 to edge 189 of thick portion 182 in the next repeating unit 106 (e.g., in parallel with segment 184-4). Short path 190 may serve to redistribute current flow across traces 180 relative to the arrangement of FIG. 13. The redistributed current flow may increase the capacitive coupling between capacitor electrodes 24 and 42 and thus the overall wireless charging efficiency of system 8 in scenarios where radius 168 of stylus 10 is greater than half the height of tablet 12, for example.

Figure 15:
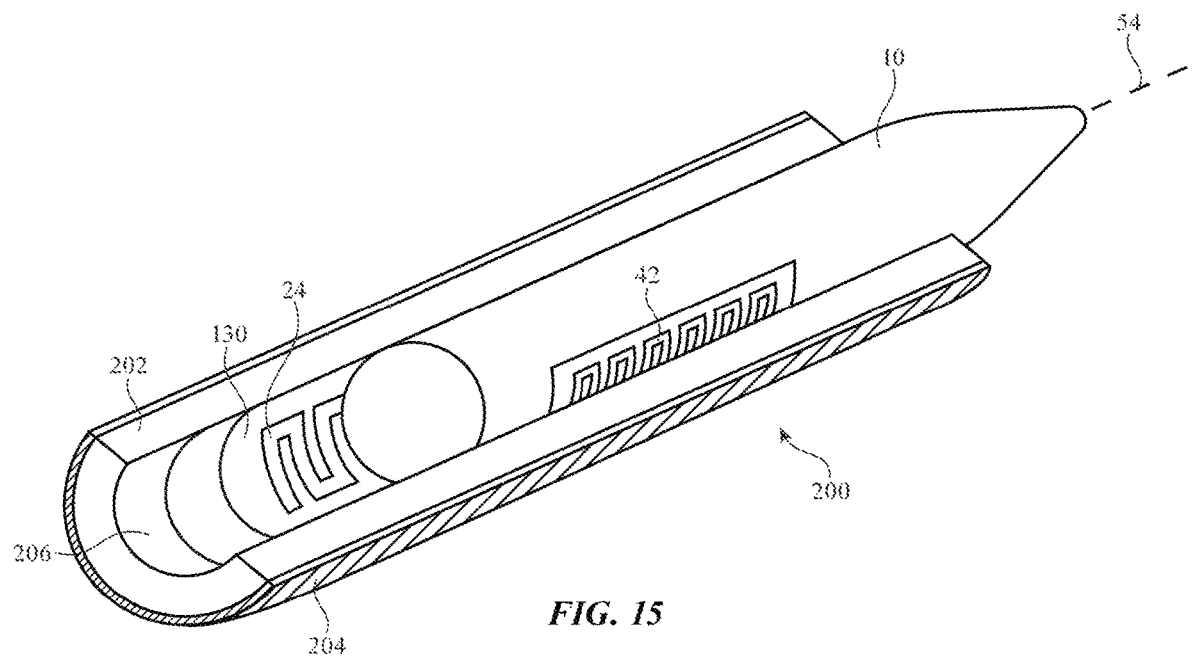
FIG. 15 is a perspective view of a wireless power transmitting structure having at least one wireless power transmitting capacitor electrode formed on a half-cylindrical surface that receives a computer stylus in accordance with an embodiment.

If desired, tablet 12 may be provided with a wireless power transmitting structure having a half-cylindrical shape for receiving stylus 10. FIG. 15 is a perspective view of a half-cylindrical wireless power transmitting structure 200. Structure 200 may be formed on rear wall 64R, on sidewall 64W, or on the surface of display 32 of tablet 12, if desired. In another suitable arrangement, structure 200 may be incorporated within a cover or case for tablet 12.

As shown in FIG. 15, wireless power transmitting structure 200 has a dielectric carrier 202 with a half-cylindrical interior surface 206. The example in which interior surface 206 is half-cylindrical is merely illustrative and, if desired, surface 206 may have any curved or polygonal shape (e.g., a shape that mates with the shape of stylus 10). Structure 200 may receive stylus 10 for wireless charging. When it is desired to wirelessly charge stylus 10, stylus 10 is placed onto interior surface 206. One or more substrates 130 and corresponding wireless power transmission capacitor electrodes 24 may be formed on interior surface 206. If desired, capacitor electrodes 24 may be patterned directly onto interior surface 206. A protective dielectric layer may be formed over capacitor electrodes 24 at interior surface 206 if desired.

Interior surface 206 may serve to hold stylus 10 in place during wireless charging operations. If desired, the one or more capacitor electrodes 24 may extend 120 degrees or greater about longitudinal axis 54 of stylus 10 when placed on surface 206. This may allow for satisfactory capacitive coupling between electrodes 24 and 42 regardless of how stylus 10 is oriented or rotated about axis 54 on surface 206. This may, for example, allow a user to charge stylus 10 without having to focus on how stylus 10 is physically placed within structure 200. In one suitable arrangement, providing stylus 10 with three capacitor electrodes such as electrodes 42-3, 42-4, and 42-5 of FIG. 7 may ensure that stylus 10 has a strong capacitive coupling to electrodes 24 through a full 360 degrees of rotation about axis 54. However, in general, any desired number of capacitor electrodes 42 may be formed on stylus 10. If desired, conductive layer 204 may be formed over the exterior surface of dielectric carrier 202. Conductive layer 204 may provide structural support for structure 200 and may shield capacitor electrodes 24 and 42 from exterior interference, for example.

Figure 16:
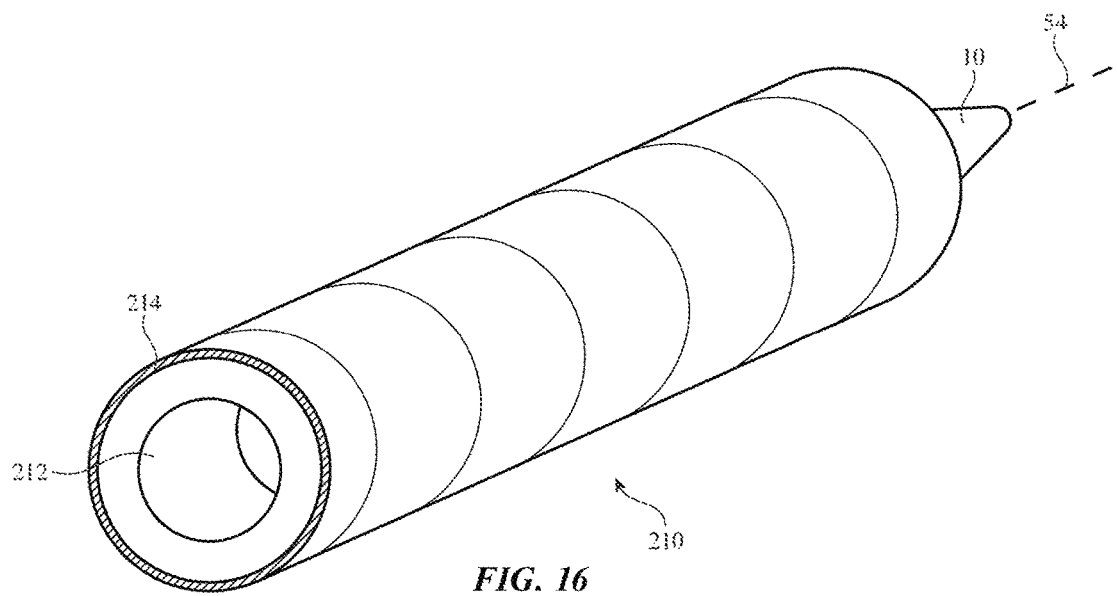
FIG. 16 is a perspective view of a wireless power transmitting structure having at least one wireless power transmitting capacitor electrode formed on a cylindrical surface that receives a computer stylus in accordance with an embodiment.

If desired, tablet 12 may be provided with a wireless power transmitting structure having a cylindrical or tubular shape for receiving stylus 10. FIG. 16 is a perspective view of a cylindrical wireless power transmitting structure 210. Structure 210 may be formed on rear wall 64R, within tablet 12 (e.g., so that stylus 10 is inserted into structure 210 through an opening in a sidewall 64W), or on the surface of display 32 of tablet 12, if desired. In another suitable arrangement, structure 210 may be incorporated within a cover or case for tablet 12.

As shown in FIG. 16, wireless power transmitting structure 210 has a dielectric carrier 212 with a cylindrical or tubular interior surface 212. The example in which interior surface 212 is cylindrical is merely illustrative and, if desired, surface 212 may have any curved or polygonal shape (e.g., a shape that mates with the shape of stylus 10). Structure 210 may receive stylus 10 for wireless charging. When it is desired to wirelessly charge stylus 10, stylus 10 is placed into structure 210 and on interior surface 212. One or more substrates 130 and corresponding wireless power transmission capacitor electrodes 24 may be formed on interior surface 206. If desired, capacitor electrodes 24 may be patterned directly onto interior surface 206. A protective dielectric layer may be formed over capacitor electrodes 24 at interior surface 206 if desired.

In one exemplary arrangement three capacitor electrodes 24 are provided on interior surface 212. The capacitor electrodes 24 may be evenly spaced about longitudinal axis 54. The capacitor electrodes may, for example, extend at least 120 degrees about axis 54. As an example, each capacitor electrode 24 extends 60 degrees about axis 54 (with 60 degrees separating each electrode). As another example, each capacitor electrode 24 extends 40 degrees about axis 54 (with 80 degrees separating each electrode). This is merely illustrative and, in general, any desired number of electrodes having any desired size may be used.

Forming electrodes 24 at different locations around longitudinal axis 54 may allow satisfactory capacitive coupling between electrodes 24 and 42 regardless of how stylus 10 is oriented or rotated about axis 54 on surface 206. This may, for example, allow a user to charge stylus 10 without having to focus on how stylus 10 is physically placed within structure 210. If desired, conductive layer 214 may be formed over the exterior surface of dielectric carrier 202. Conductive layer 214 may provide structural support for structure 210 and may shield capacitor electrodes 24 and 42 from exterior interference, for example.

Figure 17:
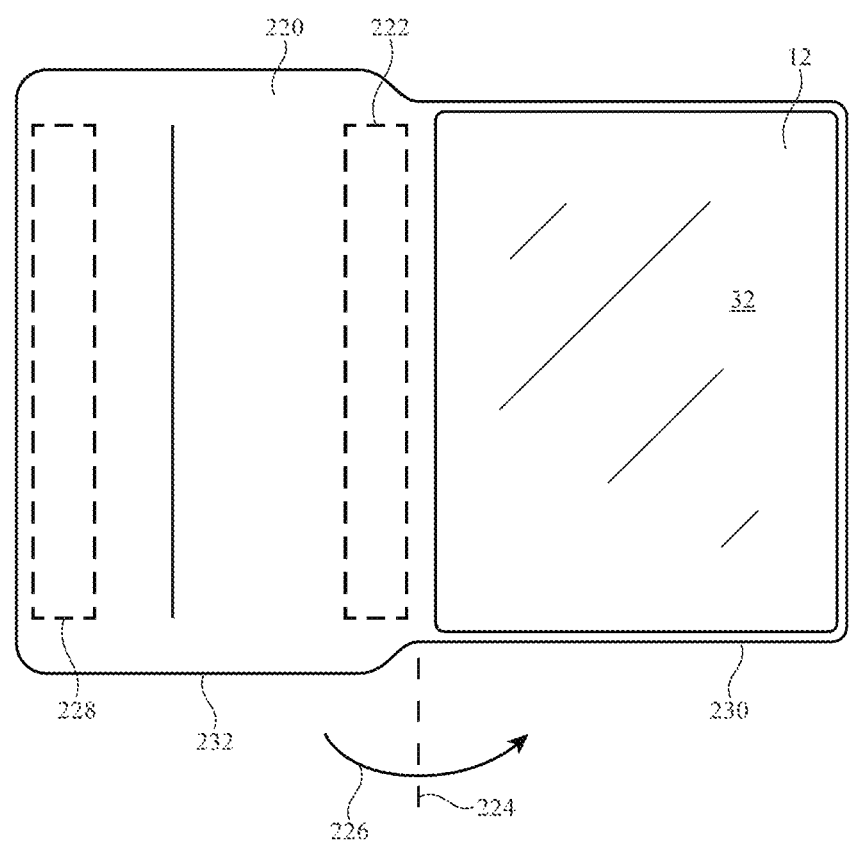
FIG. 17 is a diagram showing how a wireless power transmitting structure of the type shown in FIGS. 15 and 16 may be mounted to a cover for a tablet computer in accordance with an embodiment.

FIG. 17 is a diagram showing how wireless power transmission structures such as half-cylindrical structure 200 of FIG. 15 or cylindrical structure 210 of FIG. 16 may be integrated within a cover for tablet computer 12. As shown in FIG. 17, tablet computer 12 may be mounted to cover (case) 220. Case 220 may include a first portion 230 to which tablet computer 12 is mounted and a second portion 232 that rotates with respect to first portion 230 about fold axis 224 (as shown by arrow 226). When in a closed position, second portion 232 may serve to protect screen 32 of tablet 12 from damage. When in an open position, a user may view content displayed on screen 32.

In one suitable arrangement, wireless power transmission structure 200 of FIG. 15 or 210 of FIG. 16 may be formed on cover 220 within region 222 adjacent to axis 224. In another suitable arrangement, wireless power transmission structure 200 or 210 may be formed within region 228 on cover portion 232 (e.g., adjacent to an edge of cover portion 232 opposite to axis 224). In general, structures 200 and 210 may be formed at any desired location on cover 220. Cover 220 may include conductive lines and/or other circuitry for conveying power from tablet 12 to capacitor electrodes 24 in structures 200/210.

The examples of FIGS. 2-17 in which device 10 is a computer stylus and device 12 is a tablet computer are merely illustrative. In general, wireless power receiving device 10 and wireless power transmitting device 12 may be any desired devices (e.g., a mobile telephone, a computer mouse, a desktop computer, a laptop computer, a peripheral device, a wireless keyboard, etc.). The arrangement of FIGS. 1-17 may provide a sufficiently high end-to-end (overall) charging efficiency (e.g., 80% or higher) while also requiring less space within devices 10 and 12 than in scenarios where larger components such as inductive coils are used for performing wireless charging. Capacitor electrodes 24 and 42 may exhibit a sufficiently high capacitive coupling efficiency for wirelessly powering device 10 (e.g., a capacitive coupling efficiency of 80-95% or higher).

The foregoing is illustrative and various modifications can be made to the described embodiments. The foregoing embodiments may be implemented individually or in any combination.

What is claimed is:

1. An electronic stylus, wherein the electronic stylus is configured to receive wireless power from a wireless power transmitting device, the electronic stylus comprising:
   an elongated body having a tip and an opposing end coupled by a shaft that extends along a longitudinal axis and that has a circumference;
   electrical components in the shaft;
   a wireless power receiving capacitor electrode wrapped around at least some of the circumference of the shaft, wherein the wireless power receiving capacitor electrode is configured to receive the wireless power from the wireless power transmitting device via capacitive coupling;
   rectifier circuitry that is configured to convert the wireless power received by the wireless power receiving capacitor electrode into a direct-current (DC) voltage; and
   power management circuitry configured to power the electrical components using the DC voltage.

2. The electronic stylus of claim 1, wherein the wireless power receiving capacitor electrode comprises a conductive trace on a dielectric substrate.

3. The electronic stylus of claim 2, wherein the conductive trace comprises an electrode terminal coupled to the rectifier circuitry and wherein the conductive trace comprises a floating end.

4. The electronic stylus of claim 3, wherein the floating end is interposed between the electrode terminal and a first end of the longitudinal axis and wherein the electrode terminal is interposed between the floating end and a second end of the longitudinal axis.

5. The electronic stylus of claim 4, wherein the conductive trace follows a meandering path from the electrode terminal to the floating end.

6. The electronic stylus of claim 5, wherein the conductive trace comprises a plurality of repeating units.

7. The electronic stylus of claim 1, wherein the wireless power receiving capacitor electrode extends at least 30 degrees around the longitudinal axis.

8. The electronic stylus of claim 1, further comprising:
   an additional wireless power receiving capacitor electrode wrapped around at least some of the circumference of the shaft, wherein the additional wireless power receiving capacitor electrode is configured to receive the wireless power from the wireless power transmitting device via capacitive coupling.

9. The electronic stylus of claim 1, further comprising:
   a magnetic alignment structure on the shaft and positioned to magnetically couple with a magnetic structure on the wireless power transmitting device, wherein the wireless power receiving capacitor electrode is positioned to align with a wireless power transmitting capacitor electrode on the wireless power transmitting device when the magnetic alignment structure is magnetically coupled with the magnetic structure on the wireless power transmitting device.

10. The electronic stylus of claim 9, wherein the magnetic alignment structure comprises a magnetic ring that extends around the circumference of the shaft.

11. An electronic stylus, wherein the electronic stylus is configured to receive wireless power from a wireless power transmitting device, the electronic stylus comprising:
   a wireless power receiving capacitor electrode, wherein the wireless power receiving capacitor electrode is configured to receive the wireless power from the wireless power transmitting device via capacitive coupling; and
   rectifier circuitry coupled to the wireless power receiving capacitor electrode, wherein the rectifier circuitry is configured to convert the wireless power received by the wireless power receiving capacitor electrode into a direct-current (DC) voltage and wherein the wireless power receiving capacitor electrode comprises a conductive trace with a plurality of repeating units.

12. The electronic stylus of claim 11, wherein the conductive trace has an electrode terminal coupled to the rectifier circuitry and a floating end opposite the electrode terminal.

13. The electronic stylus of claim 12, wherein the wireless power receiving capacitor electrode follows a meandering path from the electrode terminal to the floating end.

14. The electronic stylus of claim 11, wherein each repeating unit in the plurality of repeating units comprises a thick portion having a first width, a thin portion coupled to a first edge of the thick portion and having a second width that is less than the first width, and a short path coupled between the thin portion and a second edge of the thick portion.

15. The electronic stylus of claim 11, further comprising:
a battery; and
power management circuitry configured to charge the battery using the DC voltage.

16. The electronic stylus of claim 11, further comprising:
an elongated body having a tip and an opposing end coupled by a shaft;
electrical components in the shaft; and
power management circuitry configured to power the electrical components using the DC voltage.

17. An electronic stylus, wherein the electronic stylus is configured to receive wireless power from a wireless power transmitting device, the electronic stylus comprising:
a wireless power receiving capacitor electrode, wherein the wireless power receiving capacitor electrode is configured to receive the wireless power from the wireless power transmitting device via capacitive coupling;
rectifier circuitry coupled to the wireless power receiving capacitor electrode, wherein the rectifier circuitry is configured to convert the wireless power received by the wireless power receiving capacitor electrode into a direct-current (DC) voltage; and
a magnetic alignment structure positioned to magnetically couple with a magnetic structure on the wireless power transmitting device, wherein the wireless power receiving capacitor electrode is positioned to align with a wireless power transmitting capacitor electrode on the wireless power transmitting device when the magnetic alignment structure is magnetically coupled with the magnetic structure on the wireless power transmitting device.

18. The electronic stylus of claim 17, further comprising:
an elongated body having a tip and an opposing end coupled by a shaft, wherein the magnetic alignment structure is on the shaft.

19. The electronic stylus of claim 17, wherein the wireless power receiving capacitor electrode comprises a conductive trace with a plurality of repeating units.

20. The electronic stylus of claim 17, further comprising:
an antenna configured to transmit radio-frequency signals to the wireless power transmitting device.

* * * * *